US012772242B2

(12) United States Patent
Matsumura et al.

(10) Patent No.: US 12,772,242 B2
(45) Date of Patent: Oct. 20, 2026

(54) TERMINAL AND COMMUNICATION METHOD

(71) Applicant: NTT DOCOMO, INC., Tokyo (JP)

(72) Inventors: Yuki Matsumura, Tokyo (JP); Shinya Kumagai, Tokyo (JP); Naoya Shibaike, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 294 days.

(21) Appl. No.: 18/693,458

(22) PCT Filed: Sep. 29, 2021

(86) PCT No.: PCT/JP2021/035993
§ 371 (c)(1), (2) Date: Mar. 19, 2024

(87) PCT Pub. No.: WO2023/053301
PCT Pub. Date: Apr. 6, 2023

(65) Prior Publication Data

US 2024/0397510 A1 Nov. 28, 2024

(51) Int. Cl.

| | |
|---|---|
| ***H04W 72/1268*** | (2023.01) |
| ***H04L 1/1812*** | (2023.01) |
| ***H04L 5/00*** | (2006.01) |
| ***H04W 72/0457*** | (2023.01) |
| ***H04W 74/0833*** | (2024.01) |

(52) U.S. Cl.
CPC ....... *H04W 72/1268* (2013.01); *H04L 1/1812* (2013.01); *H04L 5/0012* (2013.01); *H04W 72/0457* (2023.01); *H04W 74/0833* (2013.01)

(58) Field of Classification Search
CPC ......... H04W 72/1268; H04W 72/0457; H04W 74/0833; H04W 72/21; H04L 1/1812; H04L 5/0012; H04L 5/0053
See application file for complete search history.

(56) References Cited

U.S. PATENT DOCUMENTS

2019/0261356 A1* 8/2019 Myung ................ H04W 48/12
2023/0371062 A1* 11/2023 He ........................ H04L 5/0053
2024/0172236 A1* 5/2024 Maemoto ............. H04L 1/1812
(Continued)

OTHER PUBLICATIONS

International Search Report issued in PCT/JP2021/035993 on Apr. 5, 2022 (3 pages).
(Continued)

*Primary Examiner* — Will W Lin
(74) *Attorney, Agent, or Firm* — Osha Bergman Watanabe & Burton LLP

(57) ABSTRACT

A terminal includes: a reception unit configured to receive a configuration related to an uplink control channel from a base station; a control unit configured to determine a resource of the uplink control channel, based on the configuration; and a transmission unit configured to transmit the uplink control channel via the resource. In a case where the configuration indicates that frequency hopping is disabled, the control unit causes a base sequence applied to a hop of a first half of the resource to be different from a base sequence applied to a hop of a second half of the resource, and determines the resource to be different from a resource used by a UE that is not a function-reduced UE.

5 Claims, 20 Drawing Sheets

(56) References Cited

U.S. PATENT DOCUMENTS

| | | | | |
|---|---|---|---|---|
| 2024/0195591 | A1* | 6/2024 | Mozaffari | H04L 5/0012 |
| 2024/0349284 | A1* | 10/2024 | Liu | H04L 5/0094 |

OTHER PUBLICATIONS

Written Opinion of the International Searching Authority issued in PCT/JP2021/035993 on Apr. 5, 2022 (3 pages).
3GPP TS 38.300 V16.6.0; "3rd Generation Partnership Project; Technical Specification Group Radio Access Network; NR; NR and NG-RAN Overall Description; Stage 2 (Release 16)"; Jun. 2021 (152 pages).

* cited by examiner

CELL-SPECIFIC PUCCH RESOURCE SET

| 4-bit RMSI | PUCCH format | First symbol | Number of symbols | PRB offset | Set of initial CS indexes |
|---|---|---|---|---|---|
| 0000 | 0 | 12 | 2 | 0 | {0, 3} |
| 0001 | 0 | 12 | 2 | 0 | {0, 4, 8} |
| 0010 | 0 | 12 | 2 | 3 | {0, 4, 8} |
| 0011 | 1 | 10 | 4 | 0 | {0, 6} |
| 0100 | 1 | 10 | 4 | 0 | {0, 3, 6, 9} |
| 0101 | 1 | 10 | 4 | 2 | {0, 3, 6, 9} |
| 0110 | 1 | 10 | 4 | 4 | {0, 3, 6, 9} |
| 0111 | 1 | 4 | 10 | 0 | {0, 6} |
| 1000 | 1 | 4 | 10 | 0 | {0, 3, 6, 9} |
| 1001 | 1 | 4 | 10 | 2 | {0, 3, 6, 9} |
| 1010 | 1 | 4 | 10 | 4 | {0, 3, 6, 9} |
| 1011 | 1 | 0 | 14 | 0 | {0, 6} |
| 1100 | 1 | 0 | 14 | 0 | {0, 3, 6, 9} |
| 1101 | 1 | 0 | 14 | 2 | {0, 3, 6, 9} |
| 1110 | 1 | 0 | 14 | 4 | {0, 3, 6, 9} |
| 1111 | 1 | 0 | 14 | Floor($N_{BWP}$/4) | {0, 3, 6, 9} |

UE-SPECIFIC PUCCH RESOURCE

| 3-bit DCI | CCE-based implicit 1-bit | Hopping direction | UE specific PRB offset | Initial CS index |
|---|---|---|---|---|
| 000 | 0 | 0 | 0 | 0 |
| | 1 | | | 3 |
| 001 | 0 | | | 6 |
| | 1 | | | 9 |
| 010 | 0 | | 1 | 0 |
| | 1 | | | 3 |
| 011 | 0 | | | 6 |
| | 1 | | | 9 |
| 100 | 0 | 1 | 0 | 0 |
| | 1 | | | 3 |
| 101 | 0 | | | 6 |
| | 1 | | | 9 |
| 110 | 0 | | 1 | 0 |
| | 1 | | | 3 |
| 111 | 0 | | | 6 |
| | 1 | | | 9 |

CELL-SPECIFIC PUCCH RESOURCE SET

| 4-bit RMSI | PUCCH format | First symbol | Number of symbols | PRB offset | Set of initial CS indexes |
|---|---|---|---|---|---|
| 0000 | 0 | 12 | 2 | 0 | {0, 3} |
| 0001 | 0 | 12 | 2 | 0 | {0, 4, 8} |
| 0010 | 0 | 12 | 2 | 3 | {0, 4, 8} |
| 0011 | 1 | 10 | 4 | 0 | {0, 6} |
| 0100 | 1 | 10 | 4 | 0 | {0, 3, 6, 9} |
| 0101 | 1 | 10 | 4 | 2 | {0, 3, 6, 9} |
| 0110 | 1 | 10 | 4 | 4 | {0, 3, 6, 9} |
| 0111 | 1 | 4 | 10 | 0 | {0, 6} |
| 1000 | 1 | 4 | 10 | 0 | {0, 3, 6, 9} |
| 1001 | 1 | 4 | 10 | 2 | {0, 3, 6, 9} |
| 1010 | 1 | 4 | 10 | 4 | {0, 3, 6, 9} |
| 1011 | 1 | 0 | 14 | 0 | {0, 6} |
| 1100 | 1 | 0 | 14 | 0 | {0, 3, 6, 9} |
| 1101 | 1 | 0 | 14 | 2 | {0, 3, 6, 9} |
| 1110 | 1 | 0 | 14 | 4 | {0, 3, 6, 9} |
| 1111 | 1 | 0 | 14 | Floor($N_{BWP}$/4) | {0, 3, 6, 9} |

UE-SPECIFIC PUCCH RESOURCE

| 3-bit DCI | CCE-based implicit 1-bit | Hopping direction | UE specific PRB offset | Initial CS index |
|---|---|---|---|---|
| 000 | 0 | 0 | 0 | 0 |
| | 1 | | | 3 |
| 001 | 0 | | 1 | 0 |
| | 1 | | | 3 |
| 010 | 0 | | 2 | 0 |
| | 1 | | | 3 |
| 011 | 0 | | 3 | 0 |
| | 1 | | | 3 |
| 100 | 0 | 1 | 0 | 0 |
| | 1 | | | 3 |
| 101 | 0 | | 1 | 0 |
| | 1 | | | 3 |
| 110 | 0 | | 2 | 0 |
| | 1 | | | 3 |
| 111 | 0 | | 3 | 0 |
| | 1 | | | 3 |

FIG.5

CELL-SPECIFIC PUCCH RESOURCE SET

| 4-bit RMSI | PUCCH format | First symbol | Number of symbols | PRB offset | Set of initial CS indexes |
|---|---|---|---|---|---|
| 0000 | 0 | 12 | 2 | 0 | {0, 3} |
| 0001 | 0 | 12 | 2 | 0 | {0, 4, 8} |
| 0010 | 0 | 12 | 2 | 3 | {0, 4, 8} |
| 0011 | 1 | 10 | 4 | 0 | {0, 6} |
| 0100 | 1 | 10 | 4 | 0 | {0, 3, 6, 9} |
| 0101 | 1 | 10 | 4 | 2 | {0, 3, 6, 9} |
| 0110 | 1 | 10 | 4 | 4 | {0, 3, 6, 9} |
| 0111 | 1 | 4 | 10 | 0 | {0, 6} |
| 1000 | 1 | 4 | 10 | 0 | {0, 3, 6, 9} |
| 1001 | 1 | 4 | 10 | 2 | {0, 3, 6, 9} |
| 1010 | 1 | 4 | 10 | 4 | {0, 3, 6, 9} |
| 1011 | 1 | 0 | 14 | 0 | {0, 6} |
| 1100 | 1 | 0 | 14 | 0 | {0, 3, 6, 9} |
| 1101 | 1 | 0 | 14 | 2 | {0, 3, 6, 9} |
| 1110 | 1 | 0 | 14 | 4 | {0, 3, 6, 9} |
| 1111 | 1 | 0 | 14 | Floor($N_{BWP}$/4) | {0, 3, 6, 9} |

UE-SPECIFIC PUCCH RESOURCE

| 3-bit DCI | CCE-based implicit 1-bit | Hopping direction | UE specific PRB offset | Initial CS ndex |
|---|---|---|---|---|
| 000 | 0 | 0 | 0 | 0 |
| | 1 | | | 4 |
| 001 | 0 | | | 8 |
| | 1 | | 1 | 0 |
| 010 | 0 | | | 4 |
| | 1 | | | 8 |
| 011 | 0 | | 2 | 0 |
| | 1 | | | 4 |
| 100 | 0 | 1 | 0 | 0 |
| | 1 | | | 4 |
| 101 | 0 | | | 8 |
| | 1 | | 1 | 0 |
| 110 | 0 | | | 4 |
| | 1 | | | 8 |
| 111 | 0 | | 2 | 0 |
| | 1 | | | 4 |

UE-SPECIFIC PUCCH RESOURCE FOR Redcap UE

| 3-bit DCI | CCE-based implicit 1-bit | UE specific RB offset | Initial CS index |
|---|---|---|---|
| 000 | 0 | 2 | 0 |
| | 1 | | 3 |
| 001 | 0 | | 6 |
| | 1 | | 9 |
| 010 | 0 | 3 | 0 |
| | 1 | | 3 |
| 011 | 0 | | 6 |
| | 1 | | 9 |
| 100 | 0 | $(N_{BWP}-1)-2$ | 0 |
| | 1 | | 3 |
| 101 | 0 | | 6 |
| | 1 | | 9 |
| 110 | 0 | $(N_{BWP}-1)-3$ | 0 |
| | 1 | | 3 |
| 111 | 0 | | 6 |
| | 1 | | 9 |

FIG.9

CELL-SPECIFIC PUCCH RESOURCE SET

| 4-bit RMSI | PUCCH format | First symbol | Number of symbols | PRB offset | PRB offset for RedCap UEs | Set of initial CS indexes |
|---|---|---|---|---|---|---|
| 0000 | 0 | 12 | 2 | 0 | 3 | {0, 3} |
| 0001 | 0 | 12 | 2 | 0 | 3 | {0, 4, 8} |
| 0010 | 0 | 12 | 2 | 3 | 0 | {0, 4, 8} |
| 0011 | 1 | 10 | 4 | 0 | 2 | {0, 6} |
| 0100 | 1 | 10 | 4 | 0 | 2 | {0, 3, 6, 9} |
| 0101 | 1 | 10 | 4 | 2 | 4 | {0, 3, 6, 9} |
| 0110 | 1 | 10 | 4 | 4 | 0 | {0, 3, 6, 9} |
| 0111 | 1 | 4 | 10 | 0 | 2 | {0, 6} |
| 1000 | 1 | 4 | 10 | 0 | 2 | {0, 3, 6, 9} |
| 1001 | 1 | 4 | 10 | 2 | 4 | {0, 3, 6, 9} |
| 1010 | 1 | 4 | 10 | 4 | 0 | {0, 3, 6, 9} |
| 1011 | 1 | 0 | 14 | 0 | 2 | {0, 6} |
| 1100 | 1 | 0 | 14 | 0 | 2 | {0, 3, 6, 9} |
| 1101 | 1 | 0 | 14 | 2 | 4 | {0, 3, 6, 9} |
| 1110 | 1 | 0 | 14 | 4 | 0 | {0, 3, 6, 9} |
| 1111 | 1 | 0 | 14 | Floor($N_{BWP}$/4) | Floor($N_{BWP}$/4)−2 | {0, 3, 6, 9} |

TERMINAL AND COMMUNICATION METHOD

FIELD OF THE INVENTION

The present invention relates to a terminal and a communication method in a wireless communication system.

BACKGROUND OF THE INVENTION

In 3GPP (3rd Generation Partnership Project), in order to realize further larger system capacity, further faster data transmission speed, further lower latency in a wireless communication section, etc., a wireless communication method called "5G" or "NR (New Radio)" has been discussed (hereinafter, the wireless communication method is referred to as "NR"). In 5G, various wireless technologies and network architectures are being discussed to satisfy the requirement of a radio link delay of 1 ms or less while achieving throughput of 10 Gbps or more (e.g., Non-Patent Document 1).

In addition, discussions related to a future system later than 5G, or 6G, have been started. In the future system, further improvement of communication performance and wider variety of use cases are expected.

CITATION LIST

Non-Patent Document

Non-Patent Document 1: 3GPP TS 38.300 V16.6.0 (2021-06)

SUMMARY OF THE INVENTION

Technical Problem

In LTE or NR, a UE category or a UE capability for the function-reduced IoT (Internet of Things) in which functions, such as functions related to the transmission/reception bandwidth or the number of antennas that are supported as a mandatory requirement by normal terminals, are removed. For example, in LTE, eMTC (enhanced Machine Type Communication), NB-IoT (Narrow Band IoT), etc., are defined, and in NR, RedCap (Reduced Capability), etc., are defined. With respect to the device for IoT, the supported UE capability is different from that of the conventional devices, and thus, it has been difficult to efficiently multiplex resources for transmitting uplink control information.

The present invention has been made in view of the above points, and it is an object of the present invention to enable efficient coexistence between function-reduced terminals and normal terminals in the wireless communication system.

Solution to Problem

A terminal includes: a reception unit configured to receive a configuration related to an uplink control channel from a base station: a control unit configured to determine a resource of the uplink control channel, based on the configuration; and a transmission unit configured to transmit the uplink control channel via the resource. In a case where the configuration indicates that frequency hopping is disabled, the control unit causes a base sequence applied to a hop of a first half of the resource to be different from a base sequence applied to a hop of a second half of the resource, and determines the resource to be different from a resource used by a UE that is not a function-reduced UE.

Advantageous Effects of Invention

According to the disclosed technique, efficient coexistence between function-reduced terminals and normal terminals is enabled in the wireless communication system.

BRIEF DESCRIPTION OF THE DRAWINGS

FIG. 5 is a drawing illustrating an example (3) of a resource for PUCCH transmission.

FIG. 9 is a drawing illustrating an example (2) of a resource for PUCCH transmission in an embodiment of the present invention.

DETAILED DESCRIPTION OF THE PREFERRED EMBODIMENTS

Figure 1:
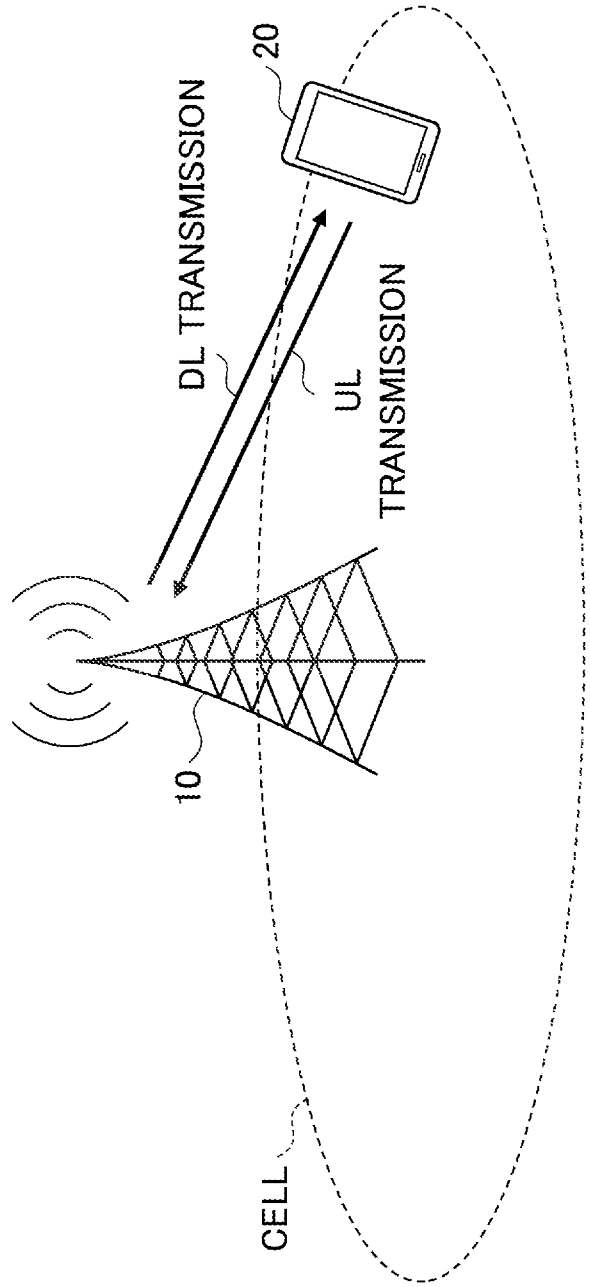
FIG. 1 is a drawing for describing a wireless communication system in an embodiment of the present invention.

In the following, referring to the drawings, one or more embodiments of the present invention will be described. It should be noted that the embodiments described below are examples. Embodiments of the present invention are not limited to the following embodiments.

In operations of a wireless communication system according to an embodiment of the present invention, a conventional technique will be used when it is appropriate. With respect to the above, for example, the conventional techniques are related to, but not limited to, the existing LTE. Further, it is assumed that the term "LTE" used in the present specification has, unless otherwise specifically mentioned, a broad meaning including a scheme of LTE-Advanced and a scheme after LTE-Advanced (e.g., NR).

Furthermore, in one or more embodiments described below, terms that are used in the existing LTE are used, such as SS (Synchronization signal), PSS (Primary SS), SSS (Secondary SS), PBCH (Physical broadcast channel), PRACH (Physical random access channel), PDCCH (Physical Downlink Control Channel), PDSCH (Physical Downlink Shared Channel), PUCCH (Physical Uplink Control Channel), PUSCH (Physical Uplink Shared Channel), etc. The above-described terms are used for the sake of description convenience. Signals, functions, etc., which are similar to the above-described terms, may be referred to as different names. Further, terms, which are used in NR and correspond to the above-described terms, are NR-SS, NR-PSS, NR-SSS, NR-PBCH, NR-PRACH, etc. However, even when a signal is used for NR, there may be a case in which the signal is not referred to as "NR-".

In addition, in an embodiment of the present invention, the duplex method may be a TDD (Time Division Duplex) method, an FDD (Frequency Division Duplex) method, or any other method (e.g., Flexible Duplex, or the like).

Further, in an embodiment of the present invention, the expression, radio (wireless) parameters are "configured (set)" may mean that a predetermined value is pre-configured, or may mean that a radio parameter indicated by the base station 10 or the terminal 20 is configured.

FIG. 1 is a drawing illustrating a wireless communication system according to an embodiment of the present invention. As illustrated in FIG. 1, a wireless communication system according to an embodiment of the present invention includes a base station 10 and a terminal 20. In FIG. 1, a single base station 10 and a single terminal 20 are illustrated as an example. There may be a plurality of base stations 10 and a plurality of terminals 20.

The base station 10 is a communication device that provides one or more cells and performs wireless communication with the terminal 20. Physical resources of radio signals may be defined in the time domain and the frequency domain, the time domain may be defined by the number of OFDM (Orthogonal Frequency Division Multiplexing) symbols, and the frequency domain may be defined by the number of sub-carriers or resource blocks. In addition, a TTI (Transmission Time Interval) in the time domain may be a slot or a sub-slot, or the TTI may be a subframe.

The base station 10 can perform carrier aggregation to communicate with the terminal 20 by bundling a plurality of cells (multiple CCs (component carriers)). In carrier aggregation, one primary cell (PCell) and one or more secondary cells (SCells) are used.

The base station 10 transmits a synchronization signal, system information, and the like, to the terminal 20. The synchronization signal is, for example, an NR-PSS and an NR-SSS. The system information may be transmitted via a NR-PBCH or a PDSCH, for example, and may be referred to as broadcast information. As shown in FIG. 1, the base station 10 transmits a control signal or data in DL (Downlink) to the terminal 20 and receives a control signal or data in UL (Uplink) from the terminal 20. Note that, here, what is transmitted via a control channel such as PUCCH and PDCCH is called a control signal, and what is transmitted via a shared channel such as PUSCH and PDSCH is called data. These names are mere examples.

The terminal 20 may be a communication apparatus that includes a wireless communication function such as a smartphone, a mobile phone, a tablet, a wearable terminal, a communication module for M2M (Machine-to-Machine), or the like. As shown in FIG. 1, the terminal 20 uses various communication services provided by the wireless communication system by receiving control signals or data in DL from the base station 10 and transmitting control signals or data in UL to the base station 10. Note that the terminal 20 may be referred to as a UE, and the base station 10 may be referred to as a gNB.

The terminal 20 can perform carrier aggregation to communicate with the base station 10 by bundling a plurality of cells (a plurality of CCs). In carrier aggregation, one primary cell and one or more secondary cells are used. In addition, PUCCH-SCell having PUCCH may be used.

Figure 2:
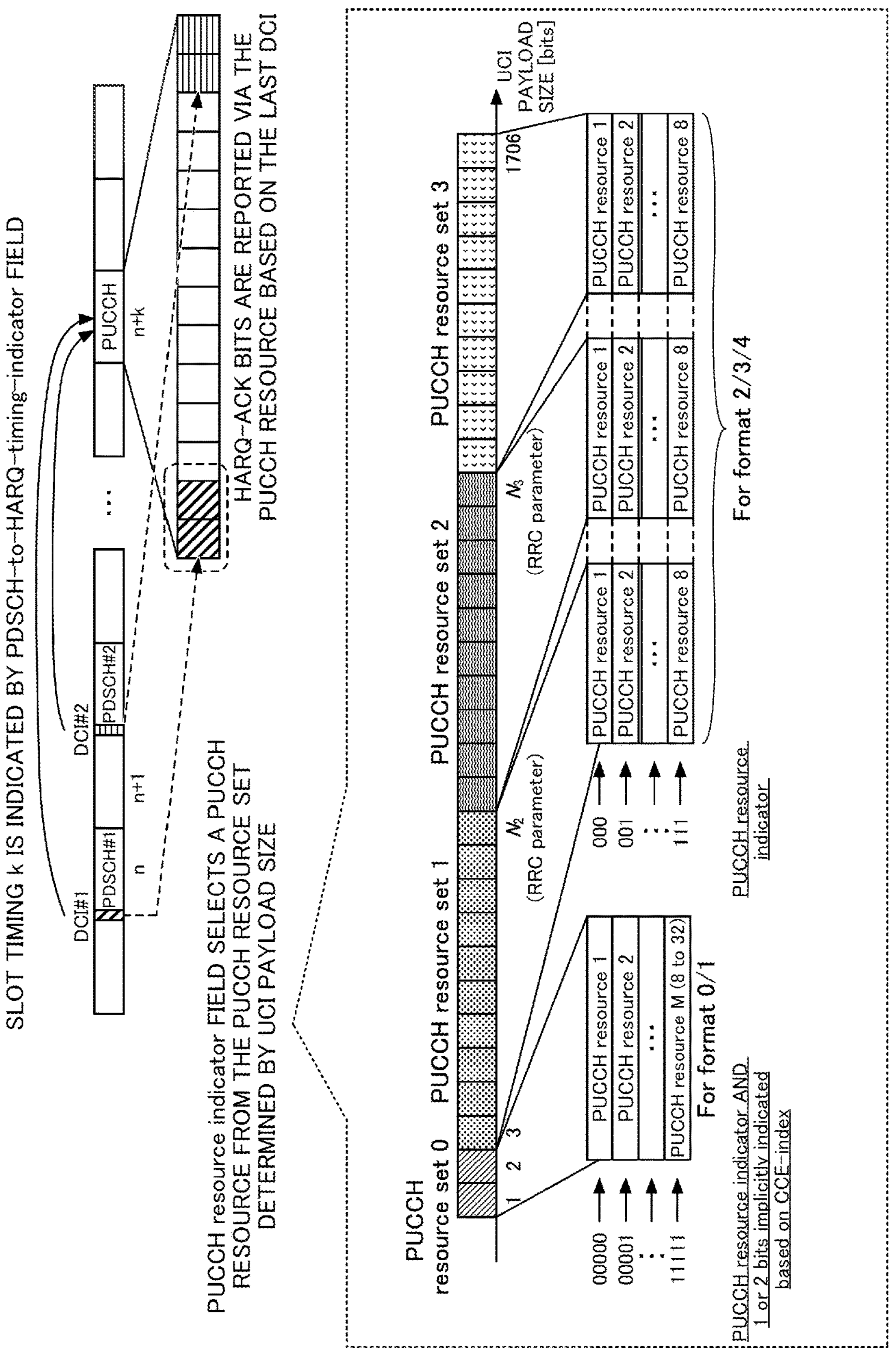
FIG. 2 is a drawing illustrating an example of PUCCH transmission.

FIG. 2 is a drawing illustrating an example of PUCCH transmission. FIG. 2 is a drawing illustrating an example in which PUCCH for reporting HARQ-ACK is transmitted after an RRC connection is established. As illustrated in FIG. 2, the PUCCH resource set is selected based on the UCI (Uplink Control Information) payload size. The PUCCH resource is indicated from a base station 10 to a terminal 20 according to 1 bit or 2 bits implicitly indicated by a CCE (Control Channel Element) index in addition to 3 bits according to DCI (Downlink Control information).

As illustrated in FIG. 2, with respect to PUCCH formats 0 and 1, the PUCCH resources are indicated according to 3 bits according to DCI and 1 bit or 2 bits implicitly indicated based on the CCE index, and, with respect to PUCCH formats 2, 3, and 4, the PUCCH resources are indicated by 3 bits according to DCI. With respect to the PUCCH resource set, the payload size is indicated by RRC (Radio Resource Control) parameters.

In addition, as illustrated in FIG. 2, in a case where the PUCCH resource in slot n+k is indicated according to DCI #1 and DCI #2, the PUCCH resource for transmitting HARQ-ACK (Hybrid automatic repeat request-Acknowledgement) bits is indicated by DCI #2 that is the last. DCI.

It is to be noted that HARQ-ACK for SPS (Semi persistent scheduling) is transmitted using a PUCCH resource indicated by an upper layer parameter.

Figure 3:
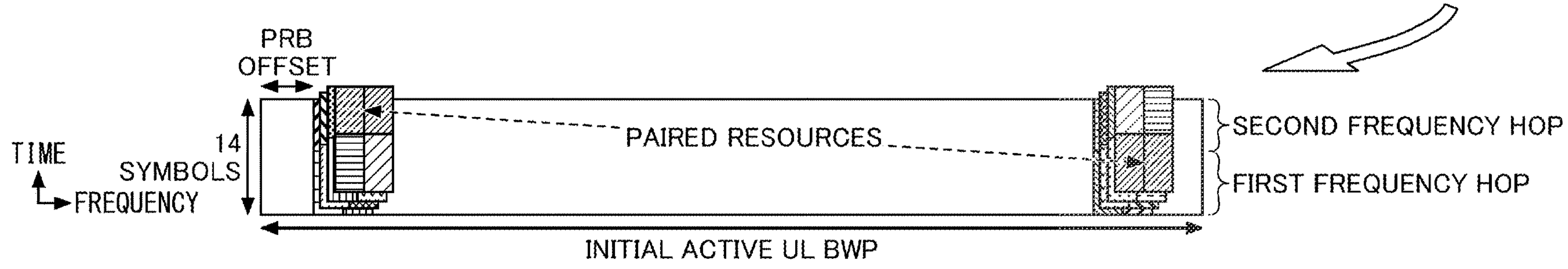
FIG. 3 is a drawing illustrating an example (1) of a resource for PUCCH transmission.

FIG. 3 is a drawing illustrating an example (1) of a resource for PUCCH transmission. FIG. 3 is a drawing illustrating a PUCCH resource before the RRC connection establishment or a PUCCH resource for a case in which the dedicated PUCCH resource (configured by an RRC parameter PUCCH-ResourceSet. of PUCCH-Config) is not configured. The PUCCH resource may be used as a PUCCH resource for transmitting HARQ-ACK corresponding to Msg.4 and Msg.B in the random access. As illustrated in FIG. 3, the PUCCH resource is determined based on: 4 bits of RMSI (Remaining minimum system information); 3 bits of DCI; and CCE-based implicit 1 bit.

More specifically, 16 cell-specific PUCCH resource sets are indicated by the 4 bits of RMSI, and UE-specific PUCCH resources are specified for each cell-specific PUCCH resource set. An example of a case in which the 4 bits of RMSI is 1101 is illustrated in FIG. 3; the cell-specific PUCCH resource set includes the PUCCH format as 1, the first symbol as 0, the number of symbols as 14, the PRB offset as 2, the set of initial CS indexes as {0, 3, 6, 9}; with respect to the UE-specific PUCCH resources, 16 resources are specified according to the hopping direction, the UE-specific PRB offset, and the initial CS index; and one of the PUCCH resources is indicated based on the 3 bits of DCI and the CCE-based implicit 1 bit.

In addition, as illustrated in FIG. 3, the frequency hopping is applied to the PUCCH resource in which 7 symbols of the first half of 14 symbols is the first frequency hop and 7 symbols of the second half is the second frequency hop. A resource in which a PRB offset and a UE-specific PRB offset is added at the lower end of an initial active UL-BWP (Bandwidth Part) and a resource in which the PRB offset and the UE-specific offset are reduced at the upper end are used as the PUCCH resource. In a case where the hopping direction is 0, the first frequency hop is located in the lower-frequency-side resource and the second frequency hop is located in the higher-frequency-side resource. In a case where the hopping direction is 1, the first frequency hop is located in the higher-frequency-side resource and the second frequency hop is located in the lower-frequency-side resource.

Figure 4:
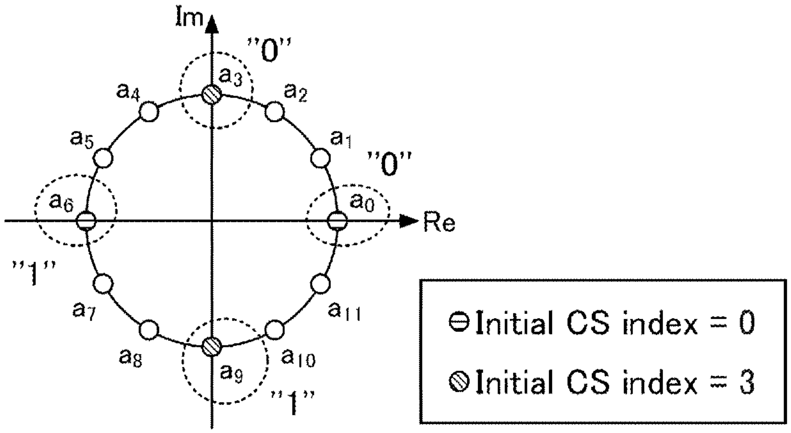
FIG. 4 is a drawing illustrating an example (2) of a resource for PUCCH transmission.

FIG. 4 is a drawing illustrating an example (2) of a resource for PUCCH transmission. An example of a case in which the 4 bits of RMSI is 0000 is illustrated in FIG. 4, and the set of initial CS indexes is {0, 3}. In the UE-specific PUCCH resource, 0 or 3 is specified as the initial CS index. As illustrated in FIG. 4, from among the cyclic shifts from $a_0$ to $a_{11}$, $a_0$ is used as 0 and $a_6$ is used as 1 for the initial CS index 0, and $a_3$ is used as 0 and $a_9$ is used as 1 for the initial CS index 3.

FIG. 5 is a drawing illustrating an example (3) of a resource for PUCCH transmission. An example of a case of 0001 is illustrated in FIG. 5, and the set of initial CS indexes is {0, 4, 8}. In the UE-specific PUCCH resource, 0, 4, or 8 is specified as the initial CS index. From among the cyclic shifts from $a_0$ to $a_{11}$, $a_0$ is used as 0 and $a_6$ is used as 1 for the initial CS index 0, $a_4$ is used as 0 and $a_{10}$ is used as 1 for the initial CS index 4, and $a_8$ is used as 0 and $a_2$ is used as 1 for the initial CS index 8.

Figure 6:
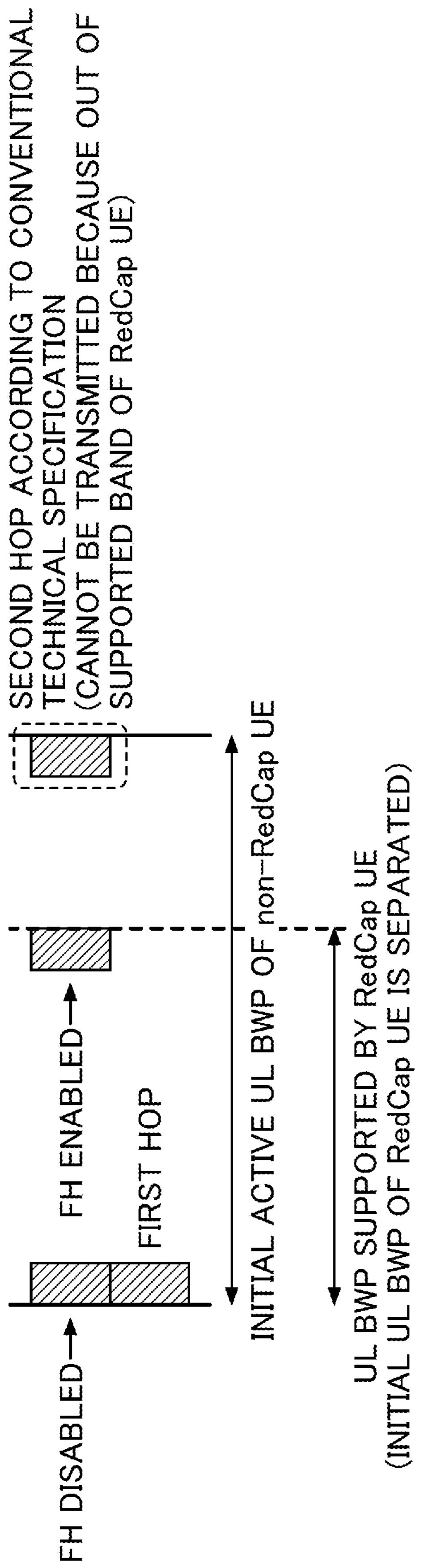
FIG. 6 is a drawing illustrating an example (1) of PUCCH transmission by a RedCap UE.

FIG. 6 is a drawing illustrating an example (1) of PUCCH transmission by a RedCap UE. The RedCap (Reduced Capability) UE in NR supports only a band that is narrower than the initial UL-BWP of the convention UE (for example, 100 MHz bandwidth). As illustrated in FIG. 6, the RedCap UE cannot perform frequency hopping at both ends of the initial UL-BWP of the conventional UE, and thus, the initial UL-BWP for the RedCap UE may be configurable. As illustrated in FIG. 6, the RedCap UE may perform frequency hopping at both ends of the initial UL-BWP for the RedCap UE.

In a case where the initial UL-BWP for the RedCap UE is configurable, the frequency hopping to be applied to a HARQ-ACK PUCCH corresponding to Msg.4 or Msg.B may be enabled or disabled. A case in which the PUSCH resources of the conventional UE are fragmented (PUSCH resource fragmentation) can be avoided by disabling the frequency hopping to be applied to the HARQ-ACK PUCCH corresponding to Msg.4 or Msg.B, which is particularly effective for a case of DFT-s-OFDM.

In addition, the RedCap UE may enable or disable the frequency hopping to be applied to the HARQ-ACK PUCCH corresponding to Msg.4 or Msg.B, based on SIB.

Figure 7:
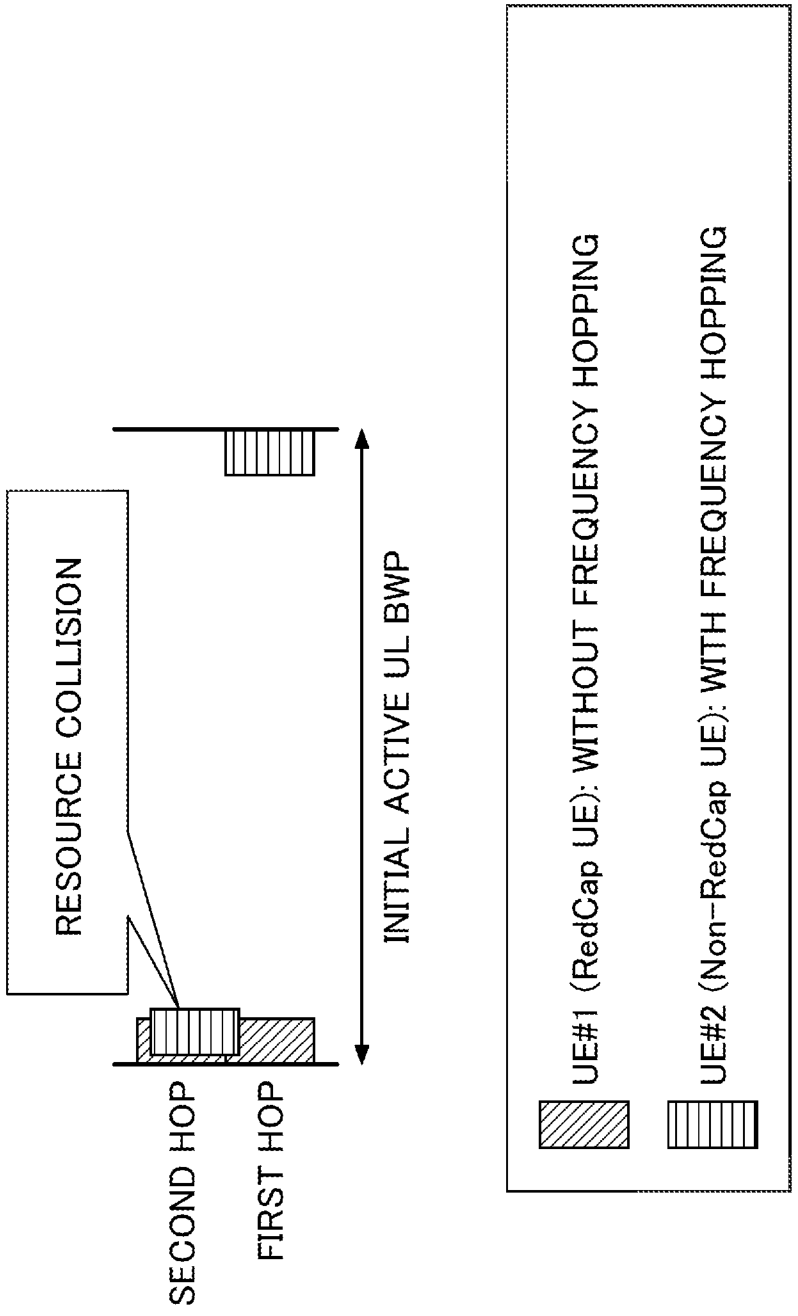
FIG. 7 is a drawing illustrating an example (2) of PUCCH transmission by a RedCap UE.

FIG. 7 is a drawing illustrating an example (2) of PUCCH transmission by a RedCap UE. A UE that is not a RedCap (Reduced Capability) UE in NR (hereinafter, also referred to as "non-RedCap UE") transmits the HARQ-ACK PUCCH corresponding to Msg.4 or Msg.B by using a method illustrated in FIG. 3. As illustrated in FIG. 7, in a case where the RedCap UE transmits the HARQ-ACK PUCCH corresponding to Msg.4 or Msg.B without applying the frequency hopping and the non-RedCap UE transmits the HARQ-ACK PUCCH corresponding to Msg.4 or Msg.B by applying the frequency hopping, the gNB cannot receive the PUCCHs properly because the PUCCH resources overlap or collide with each other.

On the other hand, in a case where the PUCCH resources are indicated by DCI in order to avoid an occurrence of the PUCCH resource collision, the PUCCH multiplexing capacity may be decreased or a resource including an unused resource spot may occur, and thus, the resources cannot be used efficiently.

Accordingly, a method of efficiently multiplexing HARQ-ACK PUCCHs corresponding Msg.4 or Msg.B is required between the non-RedCap UE and the RedCap UE.

Therefore, with respect to the PUCCH for transmitting HARQ-ACK corresponding to Msg.4 or Msg.B to be transmitted by the RedCap UE, a PUCCH resource that is at least partially different from the PUCCH resources determined by a method illustrated in FIG. 3 may be determined to be used for transmitting the PUCCH used for transmitting HARQ-ACK corresponding to Msg.4 or Msg.B.

An embodiment of the present invention may be applied to a case in which at least one of conditions 1) to 4) described below is satisfied.

Condition 1) The "RedCap UE" in an embodiment of the present invention may be a UE that is indicated to be a RedCap UE via Msg.1. Msg.3, or Msg.A, may be a UE that has performed a UE capability report indicating the RedCap, or may be a UE to which the RedCap configuration is performed by an upper layer. An embodiment of the present invention may be applied to the RedCap UE.

Condition 2) An embodiment of the present invention may be applied to the RedCap UE by limiting the case to a case in which the initial UL-BWP for RedCap is configured, that is, a case in which a separate initial UL-BWP is configured for the RedCap UE. For example, an embodiment of the present invention may be applied to a limited case in which the initial UL-BWP for RedCap is configured within the maximum bandwidth of the RedCap UE (20 MHz for FR1, 100 MHz for FR2). In addition, an embodiment of the present invention may be applied regardless of presence or absence of the initial UL-BWP for RedCap or regardless of the size of the initial UL-BWP for RedCap.

Condition 3) An embodiment of the present invention may be applied to the RedCap UE by limiting the case to a case in which the frequency hopping is enabled or disabled by SIB. For example, an embodiment of the present invention may be applied by limiting the case to a case in which the frequency hopping is disabled by SIB. In addition, in a case where the frequency hopping is not configured by SIB, the frequency hopping may be assumed to be enabled, and a resource of a PUCCH for transmitting HARQ-ACK corresponding to Msg.4 or Msg.B may be determined by using a method illustrated in FIG. 3 or a method according to an embodiment of the present invention. Alternatively, in a case where the frequency hopping is not configured by SIB, the frequency hopping may be assumed to be disabled, and a resource of a PUCCH for transmitting HARQ-ACK corresponding to Msg.4 or Msg.B may be determined by using a method illustrated in FIG. 3 or a method according to an embodiment of the present invention.

Condition 4) An embodiment of the present invention may be applied to only a case in which the frequency hopping is not used, or may be applied to the RedCap UE regardless of whether the frequency hopping is used or the frequency hopping is not used. Hereinafter, the descriptions are applied to, but are not limited to, a case in which the frequency hopping is not used for the RedCap UE and the frequency hopping is used for the non-RedCap UE. The frequency hopping may be used for the RedCap UE, and in a case where the frequency hopping is used for the RedCap UE, the hopping direction may be individually indicated to UEs via DCI and the CCE index by using a method illustrated in FIG. 3.

Figure 8:
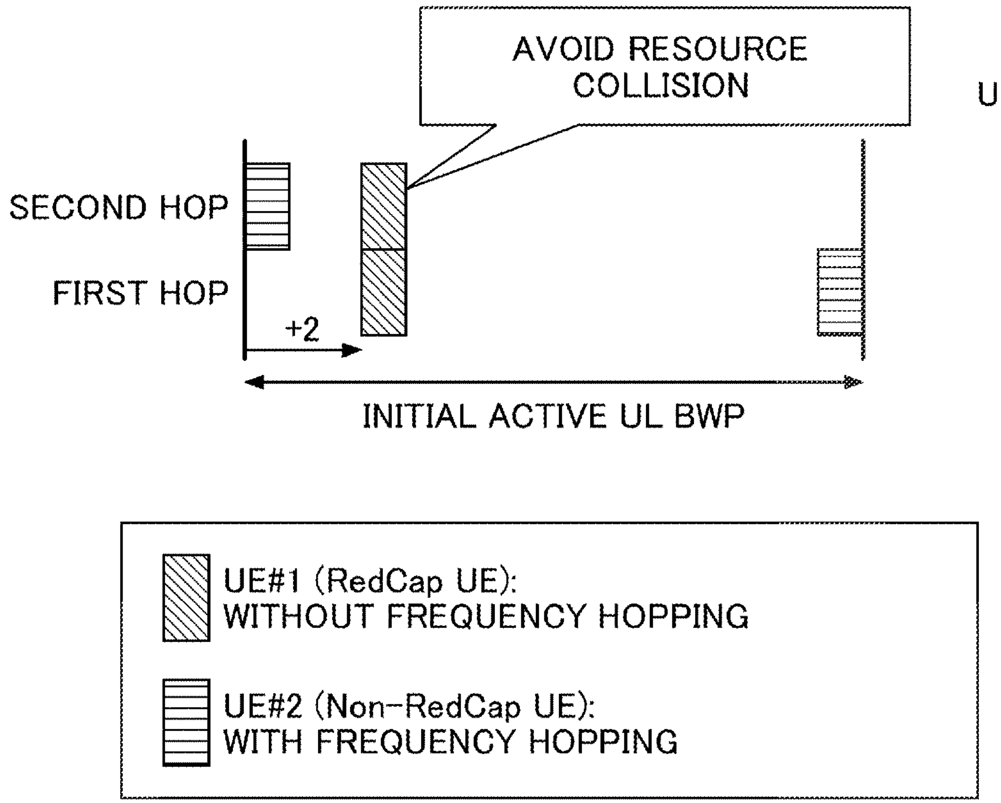
FIG. 8 is a drawing illustrating an example (1) of a resource for PUCCH transmission in an embodiment of the present invention.

FIG. 8 is a drawing illustrating an example (1) of a resource for PUCCH transmission in an embodiment of the present invention. As illustrated in FIG. 8, a table indicating the UE-specific PUCCH resources for RedCap for determining the PUCCH resource may be newly defined. With respect to the UE for which one of the above-described conditions 1) to 4) is satisfied, at least one of the UE-specific PRB offset and the CS index may be a value different from that in the conventional technical specification (for example, a method illustrated in FIG. 3).

For example, as illustrated in FIG. 8, the resource collision may be avoided by determining the UE-specific PRB offset as 2 in the UE-specific PUCCH resource. As illustrated in FIG. 8, in a case where the frequency hopping is disabled, the hopping direction is not required to be included in the information included in the UE-specific PUCCH resource.

In addition, as illustrated in FIG. 8, the UE-specific PRB offset may be $(N_{BWP}-1)-2$, $(N_{BWP}-1)-3$, or the like, in the UE-specific PUCCH resource so that the PUCCH is to be located near the upper end of UL-BWP. It is to be noted that $N_{BWP}$ may be a size of BWP, and may be indicated by the number of RBs.

In addition, in FIG. 8, an example of changing the UE-specific PUCCH resources is illustrated. However, the example is not limited to this example, and a predetermined PRB offset may be added for a UE for which one of the above-described conditions 1) to 4) is satisfied in the cell-specific PUCCH resource set, in the conventional technical specification. The predetermined PRB offset may be a constant value regardless of the 4 bits of RMSI, or may vary depending on the value of 4 bits of RMSI. The predetermined value may be defined in the technical specification, or may be configured by an upper layer (RRC. SIB, or the like).

FIG. 9 is a drawing illustrating an example (2) of a resource for PUCCH transmission in an embodiment of the present invention. As illustrated in FIG. 9, information indicating the PRB offset for RedCap may be added to the cell-specific PUCCH resource set. The RedCap UE may refer to the PRB offset for RedCap, and the non-RedCap UE may refer to the PRB offset. The set of values of the PRB offset for RedCap illustrated in FIG. 9 is an example and is not limited to this example.

In FIG. 9, a set of resources is illustrated as an example in which there are 16 UE-specific resources in an RMSI state, and thus, none of the 16 resources collides with the resource of the non-RedCap UE in the same RMSI state. It is to be noted that the PUCCH resources are located near the lower end of the initial UL-BWP in an example of FIG. 9. However, DCI and the CCE index may be additionally used for indicating that, the PUCCH resources to be located closer to the upper end or the lower end of the initial UL-BWP.

In addition, in the UE that satisfies the above-described conditions 1) to 4), the PUCCH resource may be determined according to the CS index that is different from a method illustrated in FIG. 3. For example, in the UE-specific PUCCH resources illustrated in FIG. 3, a predetermined value may be added to all of the initial CS indexes. The predetermined value may be +1, for example. It is to be noted that the predetermined value may be described as a positive value or may be described as a negative value. For example, may be described as +1 or +2, or may be described as −1 or −2.

The predetermined value may be a value described in 1) to 4) below, for example.

1) in a case where the set of initial CS indexes is (0, 3) in PF (PUCCH format) 0, the predetermined value may be +1 or +2 because the CS indexes {0, 3, 6, 9} are used.
2) In a case where the set of initial CS indexes is {0, 4, 8} in PF0, the predetermined value may be +1 because the CS indexes {0, 2, 4, 6, 8, 10} are used.
3) In a case where the set of initial CS indexes is {0, 6} in PF1, the predetermined value may be +1, +2, +3, +4, or +5 because the CS indexes {0, 6} are used. It is to be noted that the predetermined value may be +3, +2, or +4 by taking the characteristics into account in order to avoid adjacent CS indexes.
4) In a case where the set of initial CS indexes is {0, 3, 6, 9} in PF1, the predetermined value may be +1 or +2 because the CS indexes {0, 6} are used.

It is to be noted that the method of adding a predetermined value to all of the initial CS indexes in the UE-specific PUCCH resources illustrated in FIG. 3 may be applicable to a case of only some of the 4 bits of RMSI states. For example, with respect to the set of initial CS indexes {0, 6} with PF1, there is plenty of unused CS indexes. Accordingly, the method of adding a predetermined value to all of the initial CS indexes in the UE-specific PUCCH resources may be applied to only a case in which the set of initial CS indexes with PF1 is {0, 6}, for example.

Figure 10:
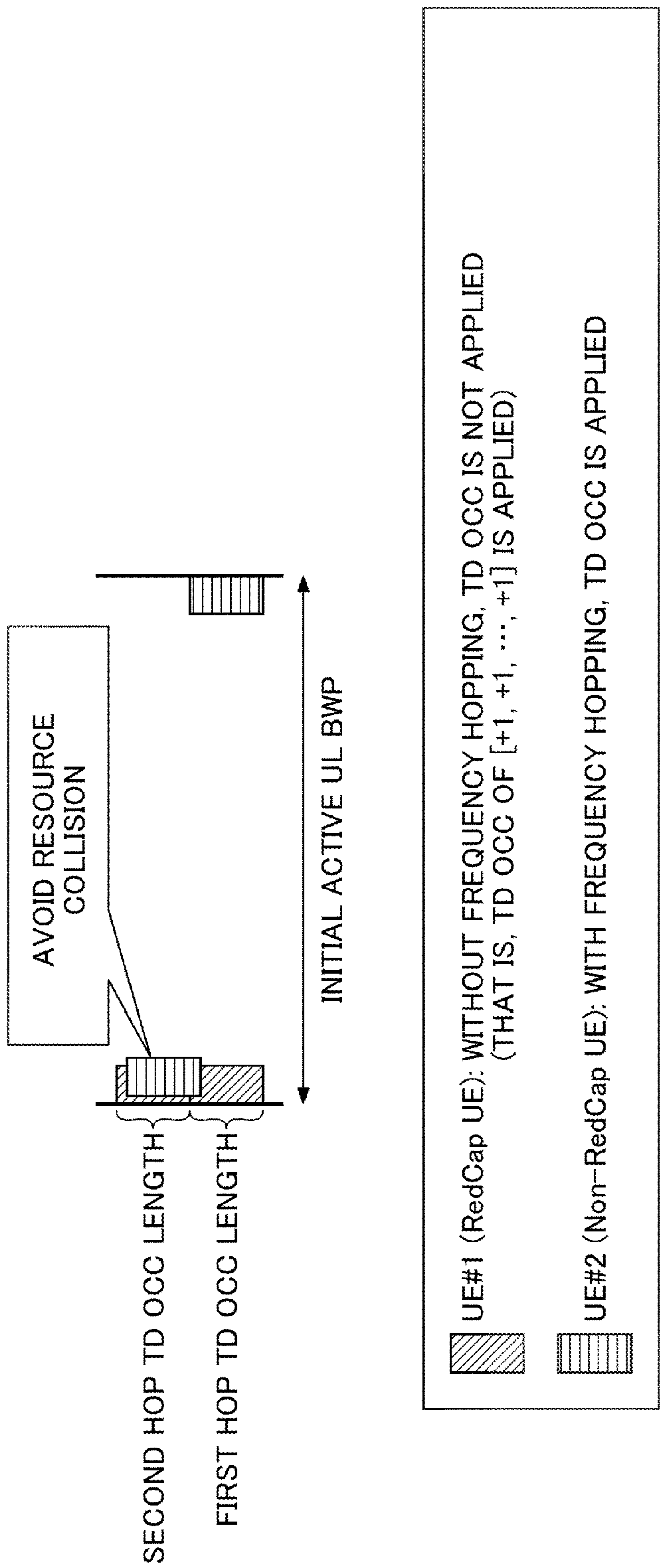
FIG. 10 is a drawing illustrating an example (3) of a resource for PUCCH transmission in an embodiment of the present invention.

FIG. 10 is a drawing illustrating an example (3) of a resource for PUCCH transmission in an embodiment of the present invention. As illustrated in FIG. 10, TD (Time domain)-OCC (Orthogonal cover code) may be introduced to the PUCCH resources. Conventionally. TD-OCC is supported with respect to PF1. However, TD-OCC is not applied with respect to PUCCH for transmitting HARQ-ACK corresponding to Msg.4 or Msg.B. It is to be noted that, a case where TD-OCC is not applied may be considered to be the same as a case where TD-OCC of [+1, +1, . . . , +1]

is applied. It is to be noted that [+1, +1, . . . , +1] means a sequence in which all codes (elements of the sequence) are "+1".

The UE that satisfies one of the above-described conditions 1) to 4) may transmit a PUCCH for transmitting HARQ-ACK corresponding to Msg.4 or Msg.B by applying TD-OCC. TD-OCC may be limited to be applied to PF1, or TD-OCC may be applied to PF0.

In order to separate the TD-OCC between UEs, even in a case where the frequency hopping is disabled, OCC may be applied with the TD-OCC length that is applied to a case where the frequency hopping is enabled.

The TD-OCC index to be applied may be different from the TD-OCC index of [+1, +1, . . . , +1]. The specific TD-OCC index may be indicated by the 4 bits of RMSI or the DCI/CCE index.

Figure 11:
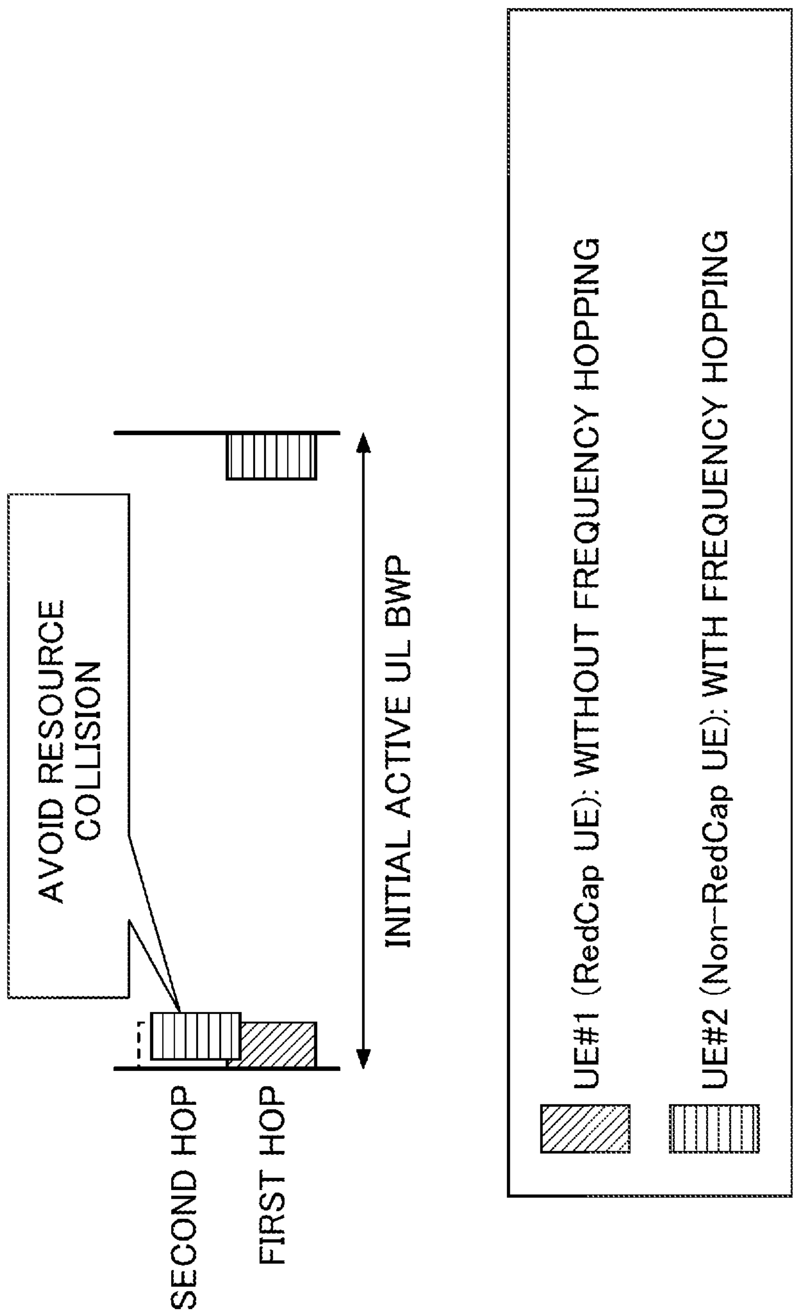
FIG. 11 is a drawing illustrating an example (4) of a resource for PUCCH transmission in an embodiment of the present invention.

FIG. 11 is a drawing illustrating an example (4) of a resource for PUCCH transmission in an embodiment of the present invention. The UE that satisfies one of the above-described conditions 1) to 4) is not required to transmit the second hop in a case where the frequency hopping is disabled as illustrated in FIG. 11. In this way, a collision with a PUCCH resource of another UE can be avoided. When the number of PUCCH symbols is N, in a case where the frequency hopping is disabled, the number of PUCCH symbols to be actually transmitted may become smaller, and there may be only the first hop of a half of the N symbols.

Enabling or disabling of the frequency hopping may be indicated by DCI or the CCE index. In a case where the frequency hopping is configured to be disabled via RRC or SIB, whether the PUCCH resource corresponding to the second hop is to be transmitted may be indicated by DCI or the CCE index. It is to be noted that the terminal 20 may transmit the second hop and is not required to transmit the first hop, or is not required to transmit a hop that overlaps with a PUCCH resource of a non-RedCap UE.

Figure 12:
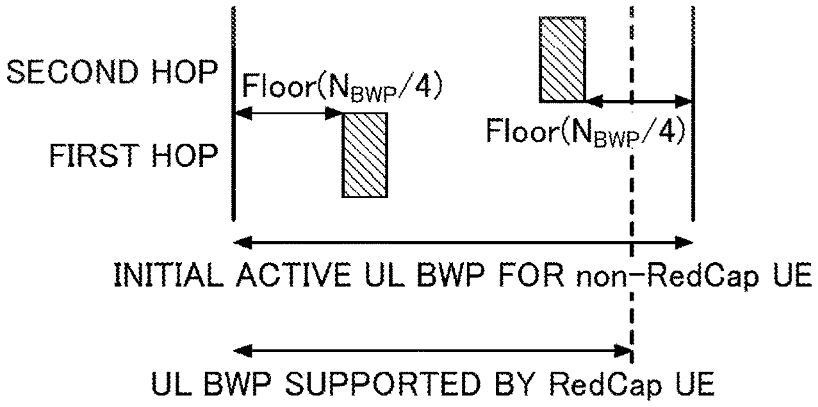
FIG. 12 is a drawing illustrating an example (5) of a resource for PUCCH transmission in an embodiment of the present invention.

FIG. 12 is a drawing illustrating an example (5) of a resource for PUCCH transmission in an embodiment of the present invention. In the method of determining the PUCCH resource illustrated in FIG. 3, in a case where the 4 bits of RMSI is 1111, the PRB offset is Floor($N_{BWP}$/4). As illustrated in FIG. 12, a resource of the frequency hopping destination may be located within the range of the initial UL-BWP for RedCap by causing the PRB offset to be Floor($N_{BWP}$/4).

For example, at least one PRB offset corresponding to the 4 bits of RMSI for RedCap among the cell-specific PUCCH resource sets may be Floor($N_{BWP}$/M). The M may be configured by the upper layer signaling including RRC, SIB, or the like, or may be defined by the technical specification. The M may be one value, or may be a value that is different for each of the 4 bits of RMSI.

Figure 13:
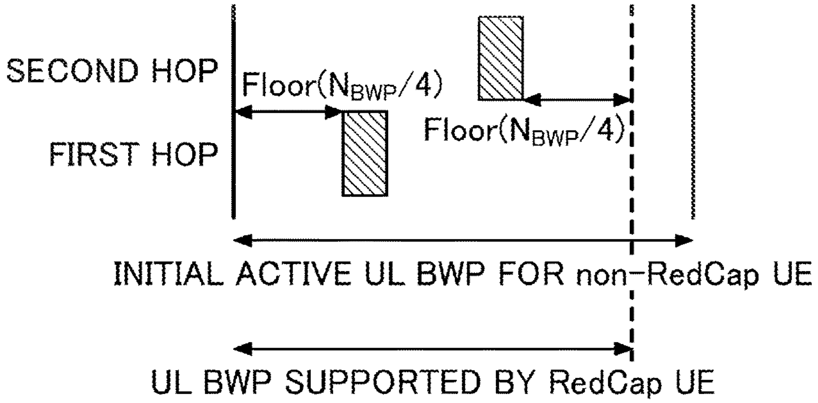
FIG. 13 is a drawing illustrating an example (6) of a resource for PUCCH transmission in an embodiment of the present invention.

FIG. 13 is a drawing illustrating an example (6) of a resource for PUCCH transmission in an embodiment of the present invention. As illustrated in FIG. 13, the frequency hopping may be performed by applying the PRB offset Floor($N_{BWP}$/4) to an upper end of the initial UL-BWP for RedCap. In other words, the first hop is located at a location at which the PRB offset Floor($N_{BWP}$/4) is applied to a lower end of the initial UL-BWP for RedCap, and the second hop is located at a location at which the PRB offset Floor($N_{BWP}$/4) is applied to an upper end of the initial UL-BWP for RedCap. According to the above-described locations, the PUCCH resource of the frequency hopping destination can be located within the range of the initial UL-BWP for RedCap.

Figure 14:
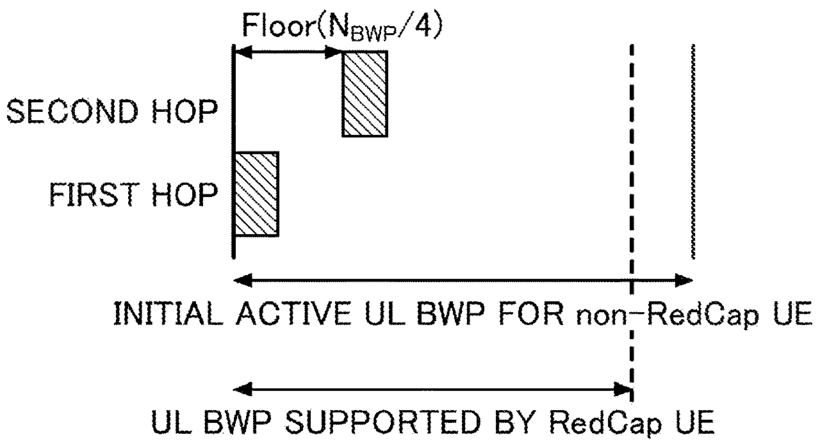
FIG. 14 is a drawing illustrating an example (7) of a resource for PUCCH transmission in an embodiment of the present invention.

FIG. 14 is a drawing illustrating an example (7) of a resource for PUCCH transmission in an embodiment of the present invention. As illustrated in FIG. 14, the frequency hopping may be performed by locating the first hop at a lower end of the initial UL-BWP for RedCap and by locating the second hop at a location at which the PRB offset X is applied to the lower end of the initial UL-BWP for RedCap. In this way, the resource of the frequency hopping destination can be located within the range of the initial UL-BWP for RedCap. FIG. 14 is an example of X=Floor($N_{BWP}$/4). The PUCCH transmission bandwidth is limited to X, and thus, the frequency hopping of the PUCCH resources can be performed within the range of the initial UL-BWP for RedCap.

Hereinafter, the base sequence hopping to be applied to PUCCH will be described. The base sequence hopping may be performed based on the frequency hopping method. For example, a slot-level base sequence hopping may be performed in a case where the frequency hopping is disabled, or a frequency-hop-level base sequence hopping may be performed in a case where the frequency hopping is enabled.

Figure 15:
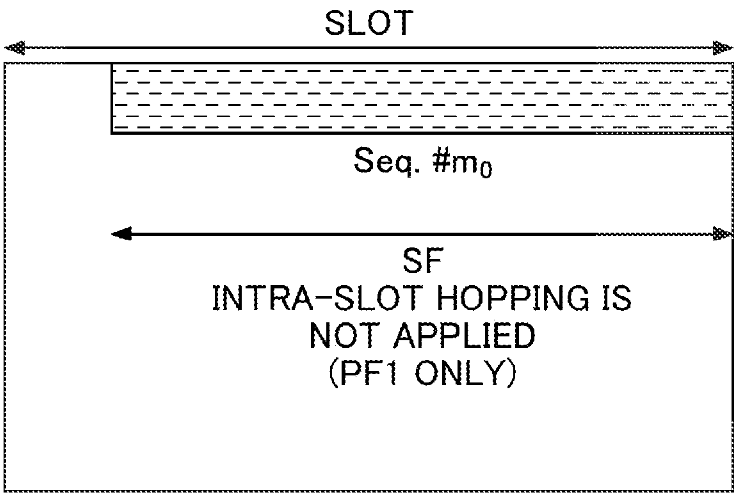
FIG. 15 is a drawing illustrating an example in which base sequence hopping is not applied to PUCCH transmission.

FIG. 15 is a drawing illustrating an example in which base sequence hopping is not applied to PUCCH transmission. In a case where the PUCCH frequency hopping is disabled, as illustrated in FIG. 15, only the sequence #$m_0$ may be used for PF1 and the intra-slot hopping is not required to be applied. The SF (Spreading factor) corresponds to the TD-OCC length, and the UE capacity becomes larger as the SF becomes larger.

Figure 16:
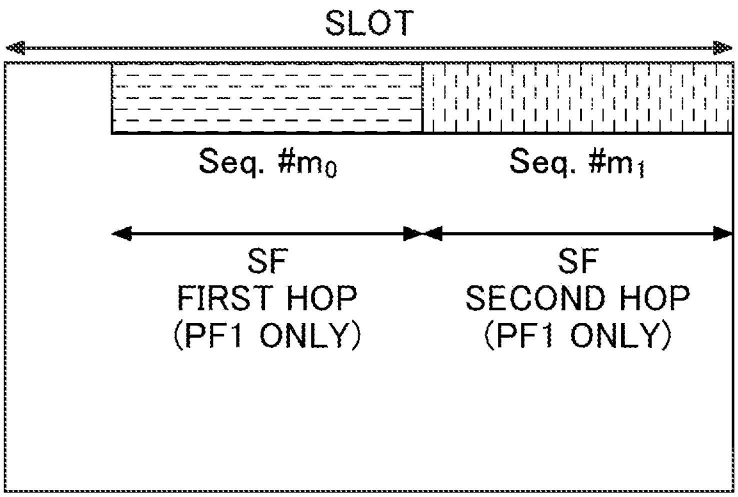
FIG. 16 is a drawing illustrating an example in which base sequence hopping is applied to PUCCH transmission.

FIG. 16 is a drawing illustrating an example in which base sequence hopping is applied to PUCCH transmission. In a case where the PUCCH frequency hopping is enabled, as illustrated in FIG. 16, for PF1, the intra-slot hopping may be performed by using the sequence #$m_0$ for the first frequency hop, and using the sequence #$m_1$ for the second frequency hop. In an example illustrated in FIG. 16, the PRB of the first frequency hop is the same as the PRB of the second frequency hop. In a case where the frequency hopping is enabled, a different base sequence index may be used for each hop index regardless of whether the PRB of the first frequency hop is the same as the PRB of the second frequency hop. It is to be noted that the TD-OCC may be applied to the PUCCH for transmitting HARQ-ACK corresponding to Msg.4 or Msg.B. The support of UEs moving with high speed can be improved as the SF becomes smaller. In addition, the probability of collision of base sequence indexes will be decreased, and thus, the capability of coping with the inter-cell interference can be improved.

In a case where the frequency hop indexes in a slot are specified as $n_{hop}$=0, 1, only the base sequence for $n_{hop}$=0 may be used when the frequency hopping is disabled, and different base sequences may be respectively used for $n_{hop}$=0, 1 when the frequency hopping is enabled.

It is to be noted that a case in which the frequency hopping is disabled and the PRB of the first hop is the same as the PRB of the second hop may be supported.

Figure 17:
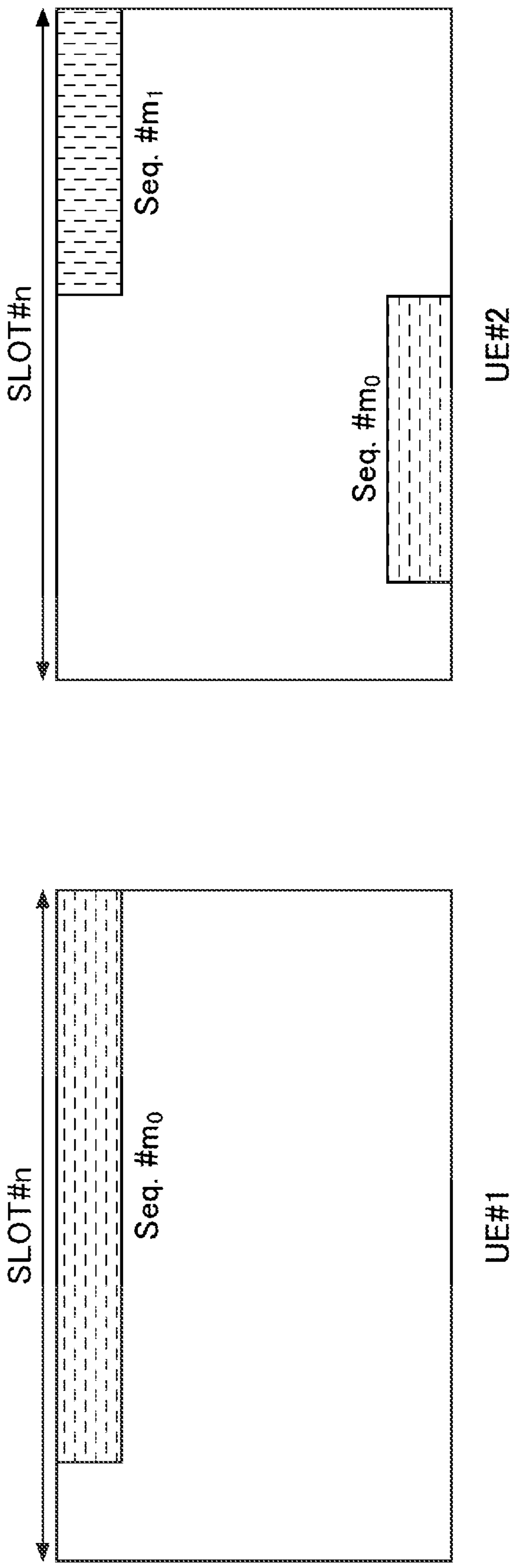
FIG. 17 is a drawing illustrating an example in which base sequence hopping and frequency hopping are applied to PUCCH transmission.

Here, sequences between different base sequence indexes are not required to have no correlation. FIG. 17 is a drawing illustrating an example in which base sequence hopping and frequency hopping are applied to PUCCH transmission. As illustrated in FIG. 17, there may be a case in which a resource to which sequence #m0 for UE #1 is applied overlaps with a resource to which sequence #m1 for UE #2 is applied in slot #n.

Figure 18:
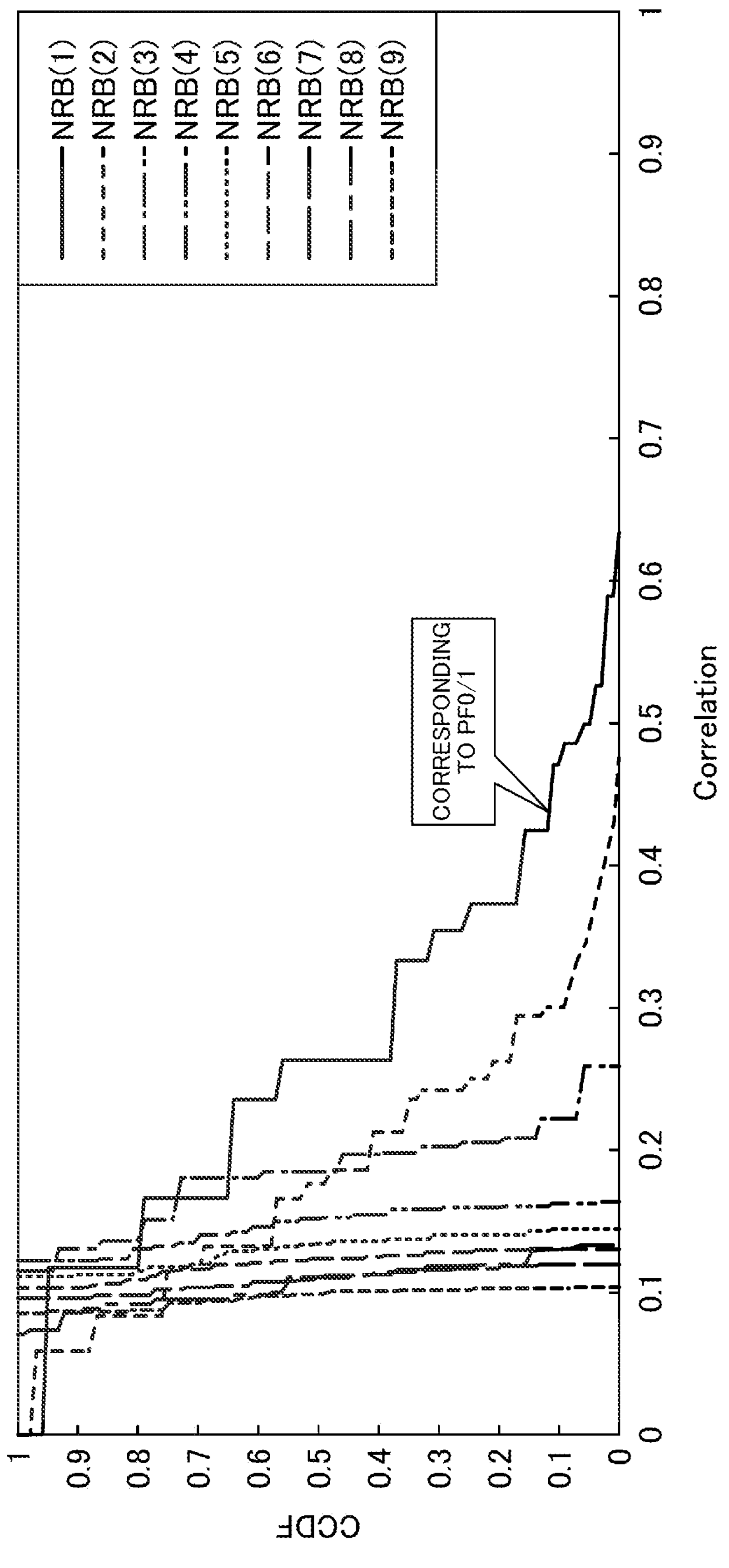
FIG. 18 is a drawing illustrating a mutual correlation between base sequence indexes.

FIG. 18 is a drawing illustrating a mutual correlation between base sequence indexes. FIG. 18 is a drawing illustrating a mutual correlation between different base sequence indexes with respect to different sequence lengths from 1 PRB to 9 PRBs in LTE. In a case of PF0 or PF1, that is, in a case where the number of PRBs is 1, the mutual correlation at CCDF=5% is approximately 0.5, which is high. Therefore, in a case where a PUCCH resource for disabled frequency hopping and a PUCCH resource for enabled frequency hopping overlap with each other, a certain level of correlation and interference occur regardless of whether CS indexes are the same, and the characteristics are deteriorated. On the other hand, there is no correlation (mutual correlation is 0) between different CS indexes with respect to the same base sequence index. However, in a case where there is frequency selectivity within the sequence length, there is also a mutual correlation between CS indexes.

Figure 19:
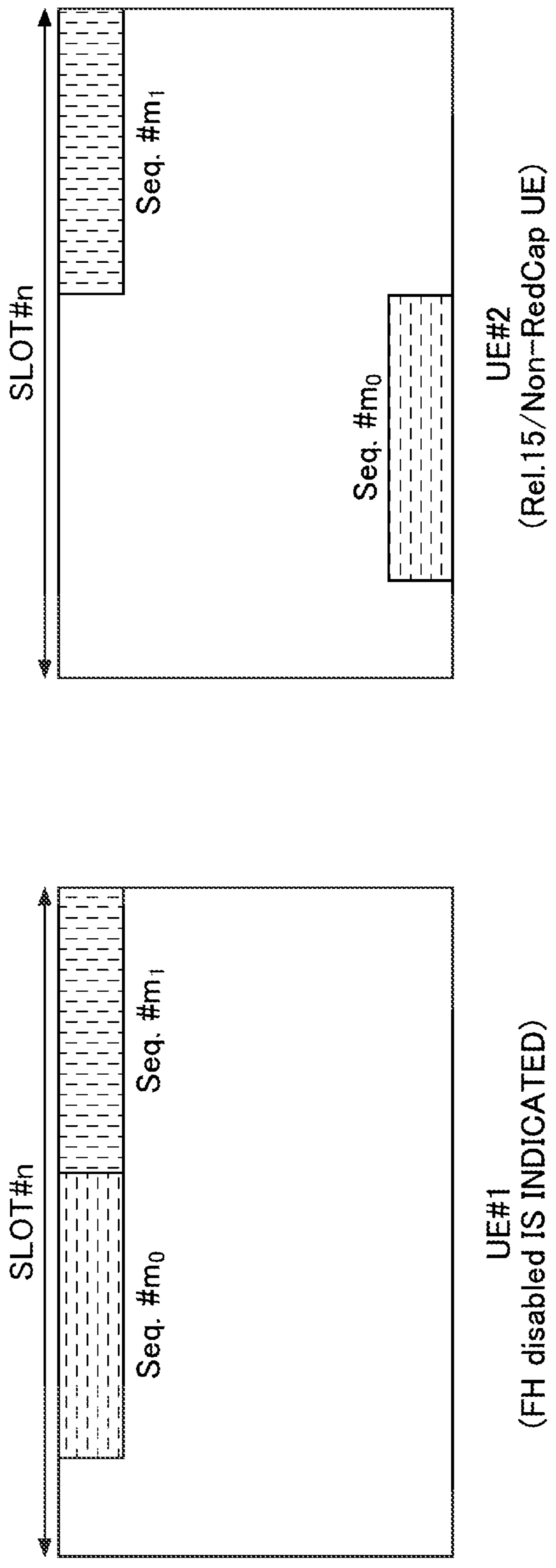
FIG. 19 is a drawing illustrating an example in which base sequence hopping is applied to PUCCH transmission in an embodiment of the present invention.

FIG. 19 is a drawing illustrating an example in which base sequence hopping is applied to PUCCH transmission in an embodiment of the present invention. In a case where the frequency hopping is indicated to be disabled by an upper layer (RRC, SIB, MAC-CE, or the like) or DCI (PRI (PUCCH resource indicator), CCE index, or the like), the UE that satisfies one of the conditions 1) to 4) may perform an operation of a case where "the frequency hopping is enabled and the PRB index of the first hop is the same as the PRB index of the second hop" is indicated.

For example, as shown by the UE #1 illustrated in FIG. 19, with respect to the first half of the floor (the number of PUCCH symbols/2) symbols among the PUCCH symbols, the base sequence (the sequence #$m_0$ in FIG. 19) may be generated according to $n_{hop}=0$, and, with respect to the second half of the floor (the number of PUCCH symbols/2) symbols among the PUCCH symbols, the base sequence (the sequence #$m_1$ in FIG. 19) may be generated according to $n_{hop}=1$. It is to be noted that TD-OCC may be applied or is not required to be applied.

In addition, as illustrated in FIG. 19, in a case where the second hops of PUCCH resources of UE #1 and UE #2 overlap with each other, the resources may be orthogonalized by applying different CS indexes or different TD-OCC indexes. The above-described operation may be applied to one of PF0 and PF1.

In addition, in the conventional technical specification, with respect to the PUCCH resources corresponding to Msg.4 or Msg.B, one of the 16 PUCCH resources is selected by DCI (PRI and CCE index). Therefore, up to 16 UEs can be multiplexed into the same UL slot.

The PUCCH resource of the RedCap UE and the PUCCH resource of the conventional UE can be orthogonalized by configuring different PUCCH resources (PRB indexes or CS indexes) by having different DCI (PRI and CCE index) indicated between the RedCap UE and the conventional UE.

Figure 20:
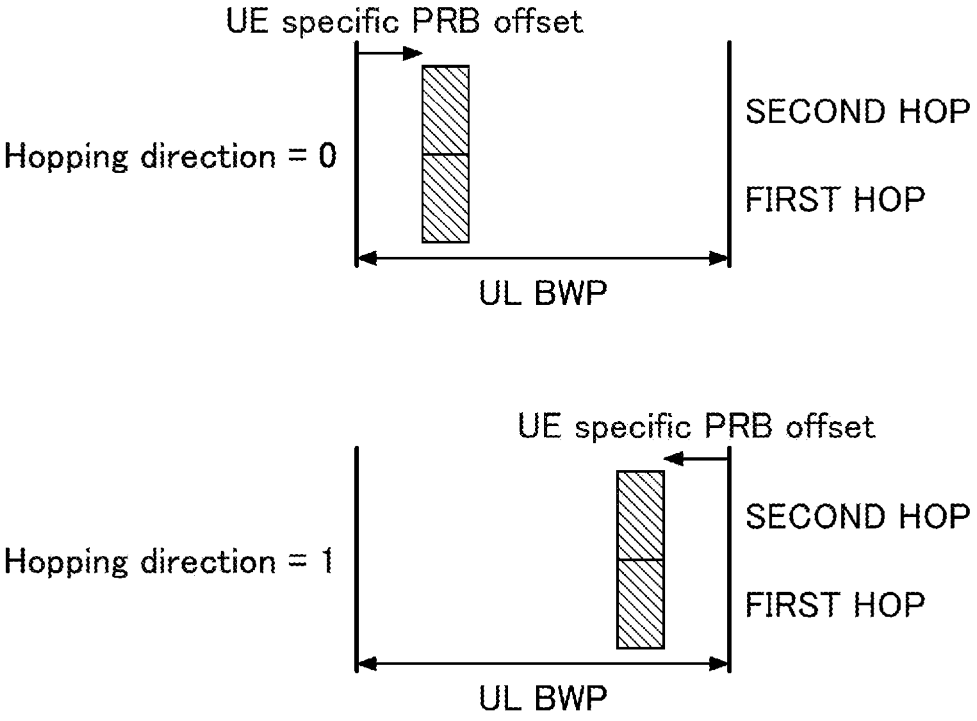
FIG. 20 is a drawing illustrating an example (8) of a resource for PUCCH transmission in an embodiment of the present invention.
Figure 21:
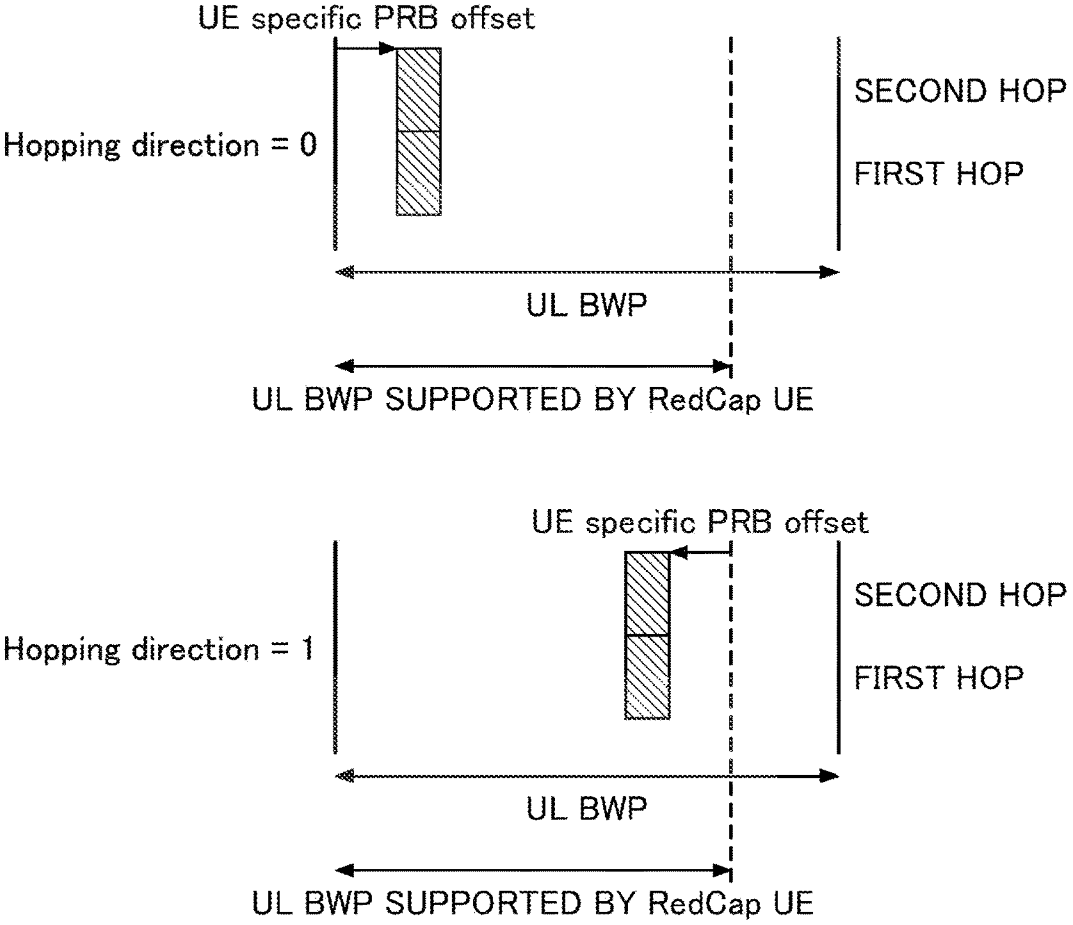
FIG. 21 is a drawing illustrating an example (9) of a resource for PUCCH transmission in an embodiment of the present invention.

FIG. 20 is a drawing illustrating an example (8) of a resource for PUCCH transmission in an embodiment of the present invention. FIG. 21 is a drawing illustrating an example (9) of a resource for PUCCH transmission in an embodiment of the present invention. In a case where the frequency hopping is indicated to be disabled by an upper layer (RRC, SIB, MAC-CE, or the like) or by DCI (PRI (PUCCH resource indicator), CCE index, or the like), as illustrated in FIG. 20, the UE that satisfies one of the conditions 1) to 4) may apply the UE-specific PRB offset in the upward direction from a lower end of the UL-initial BWP by using a value indicating the UE-specific PRB offset in a case where the hopping direction is 0, and may apply the UE-specific PRB offset in the downward direction from an upper end of the UL-initial BWP in a case where the hopping direction is 1.

In addition, in a case where the frequency hopping is indicated to be disabled by an upper layer (RRC, SIB, MAC-CE, or the like) or by DCI (PRI, CCE index, or the like), as illustrated in FIG. 21, the UE that satisfies one of the conditions 1) to 4) may apply the UE-specific PRB offset in the upward direction from a lower end of the separate UL-initial BWP supported by the RedCap UE by using a value indicating the UE-specific PRB offset, in a case where the hopping direction is 0, and may apply the UE-specific PRB offset in the downward direction from an upper end of the separate UL-initial BWP supported by the RedCap UE in a case where the hopping direction is 1.

It is to be noted that the name of "hopping direction" may be another name, and the associations between: the hopping direction is 0 and the hopping direction is 1; and an upper end and a lower end of the UL-BWP to which the UE-specific offset is applied may be reversed between FIG. 19 and FIG. 20. In other words, a case of the hopping direction being 0 may correspond to an upper end of the UL-BWP to which the UE-specific offset is applied, a case of the hopping direction being 1 may correspond to a lower end of the UL-BWP to which the UE-specific offset is applied. Information indicating which of a lower end or an upper end of the UL-BWP is to be used for applying the UE-specific PRB index to determine the PUCCH resource at the time of disabled frequency hopping may be indicated from the base station 10 to the terminal 20 via the PRI field and the CCE index.

The terminal 20 can appropriately control the PUCCH resources at the time of disabled frequency hopping by performing an operation as described above. In addition, indicating the same resource between the hopping direction being 0 and the hopping direction being 1 can be avoided.

It is to be noted that an embodiment of the present invention may be limited to be applied to a UE that has reported the UE capability described in 1) to 4) below to the network.

1) UE capability indicating whether to support RedCap
2) UE capability indicating whether to support RedCap in the RRC idle/inactive state
3) UE capability indicating whether to support a PUCCH for transmitting HARQ-ACK corresponding to Msg.4 or Msg.B
4) Bandwidth of the initial UL-BWP for RedCap It is to be noted that an embodiment of the present invention may be applied to a case where the configuration or indication is performed by upper layer signaling (for example, RRC, SIB, MAC-CE).

According to an embodiment of the present invention, orthogonal PUCCH resources can be efficiently configured for both the RedCap UE and the normal UE.

In other words, in the wireless communication system, the efficient coexistence of function-reduced terminals and normal terminals can be achieved in the wireless communication system.

(Device Configuration)

Next, a functional configuration example of the base station 10 and the terminal 20 for performing the processes and operations described above will be described. The base station 10 and terminal 20 include functions for implementing the embodiments described above. It should be noted, however, that each of the base stations 10 and the terminal 20 may include only one of the functions in an embodiment of the present invention.

<Base Station 10>

Figure 22:
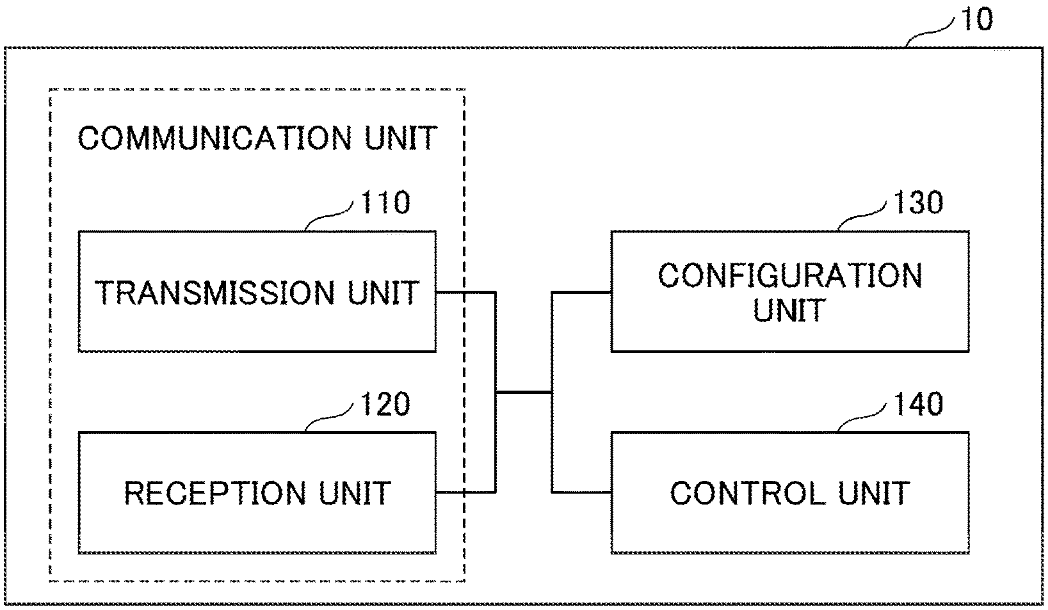
FIG. 22 is a drawing illustrating an example of a functional configuration of a base station 10 in an embodiment of the present invention.

FIG. 22 is a diagram illustrating an example of a functional configuration of the base station 10. As shown in FIG.

22, the base station 10 includes a transmission unit 110, a reception unit 120, a configuration unit 130, and a control unit 140. The functional configuration illustrated in FIG. 22 is merely an example. Functional divisions and names of functional units may be anything as long as operations according to an embodiment of the present invention can be performed. The transmission unit 110 and the reception unit 120 may be referred to as a communication unit.

The transmission unit 110 includes a function for generating a signal to be transmitted to the terminal 20 side and transmitting the signal wirelessly. The reception unit 120 includes a function for receiving various signals transmitted from the terminal 20 and acquiring, for example, information of a higher layer from the received signals. Further, the transmission unit 110 has a function of transmitting NR-PSS, NR-SSS, NR-PBCH, DL/UL control signals, the DL data, and the like, to the terminal 20. In addition, the transmission unit 110 transmits configuration information, or the like, described in the embodiment.

The configuration unit 130 stores preset configuration information and various configuration information items to be transmitted to the terminal 20 in a storage apparatus and reads the preset configuration information from the storage apparatus as necessary. The control unit 140 performs, for example, resource allocation and control of the entire base station 10. Note the functional unit related to signal transmission in the control unit 140 may be included in the transmission unit 110, and the functional unit related to signal reception in the control unit 140 may be included in the reception unit 120. Further, the transmission unit 110 and the reception unit 120 may be referred to as a transmitter and a receiver, respectively.

<Terminal 20>

Figure 23:
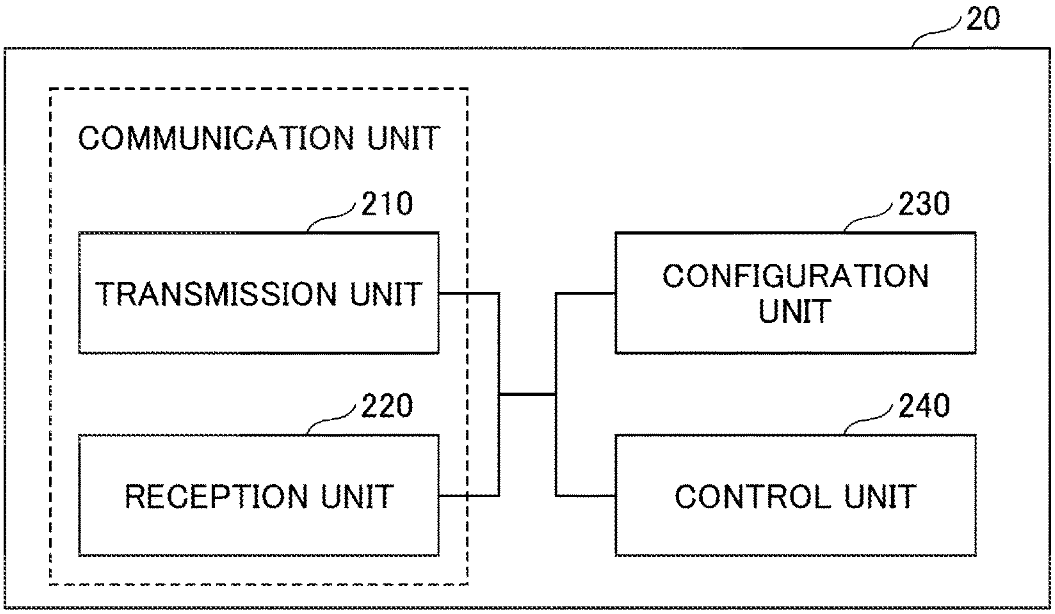
FIG. 23 is a drawing illustrating an example of a functional configuration of a terminal 20 in an embodiment of the present invention.

FIG. 23 is a diagram illustrating an example of a functional configuration of the terminal 20. As shown in FIG. 23, the terminal 20 includes a transmission unit 210, a reception unit 220, a configuration unit 230, and a control unit 240. The functional configuration illustrated in FIG. 23 is merely an example. Functional divisions and names of functional units may be anything as long as operations according to an embodiment of the present invention can be performed. The transmission unit 210 and the reception unit 220 may be referred to as a communication unit.

The transmission unit 210 generates a transmission signal from transmission data and transmits the transmission signal wirelessly. The reception unit 220 receives various signals wirelessly and obtains upper layer signals from the received physical layer signals. In addition, the transmission unit 210 transmits a HARQ-ACK, and the reception unit 220 receives configuration information described in the embodiment.

The configuration unit 230 stores, in a storage device, various configuration information items received from the base station 10 via the reception unit 220, and reads them from the storage device as necessary. In addition, the configuration unit 230 also stores pre-configured configuration information. The control unit 240 controls the entire terminal 20. Note the functional unit related to signal transmission in the control unit 240 may be included in the transmission unit 210, and the functional unit related to signal reception in the control unit 240 may be included in the reception unit 220. Further, the transmission unit 210 and the reception unit 220 may be referred to as a transmitter and a receiver, respectively.

(Hardware Structure)

In the above block diagrams used for describing an embodiment of the present invention (FIG. 22 and FIG. 23), functional unit blocks are shown. The functional blocks (function units) are realized by a freely-selected combination of hardware and/or software. Further, realizing means of each functional block is not, limited in particular. In other words, each functional block may be realized by a single apparatus in which multiple elements are coupled physically and/or logically, or may be realized by two or more apparatuses that are physically and/or logically separated and are physically and/or logically connected (e.g., wired and/or wireless). The functional blocks may be realized by combining the above-described one or more apparatuses with software.

Functions include, but are not limited to, judging, determining, calculating, processing, deriving, investigating, searching, checking, receiving, transmitting, outputting, accessing, resolving, selecting, establishing, comparing, assuming, expecting, and deeming, broadcasting, notifying, communicating, forwarding, configuring, reconfiguring, allocating, mapping, and assigning, etc. For example, a functional block (component) that functions to perform transmission is called a transmitting unit or a transmitter. In either case, as described above, the implementation method is not particularly limited.

Figure 24:
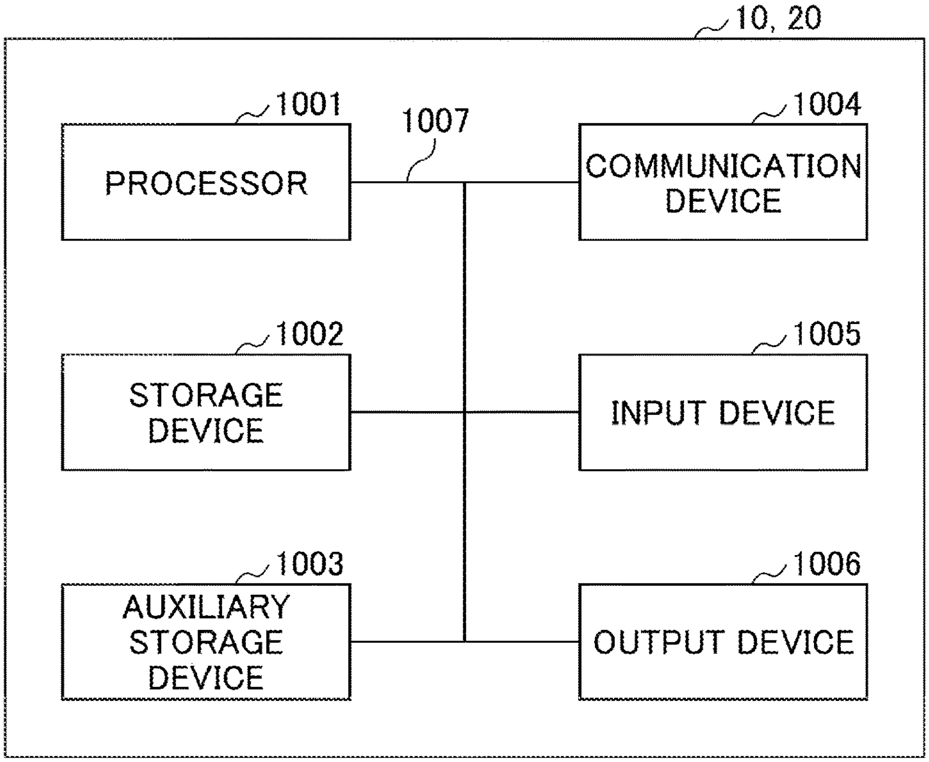
FIG. 24 is a drawing illustrating an example of a hardware structure of the base station 10 or the terminal 20 in an embodiment of the present invention.

For example, the base station 10, terminal 20, etc., according to an embodiment of the present disclosure may function as a computer for processing the radio communication method of the present disclosure. FIG. 24 is a drawing illustrating an example of hardware structures of the base station 10 and terminal 20 according to an embodiment of the present invention. Each of the above-described base station 10 and the terminal 20 may be physically a computer device including a processor 1001, a storage device 1002, an auxiliary storage device 1003, a communication device 1004, an input device 1005, an output device 1006, a bus 1007, etc.

It should be noted that, in the descriptions below, the term "apparatus" can be read as a circuit, a device, a unit, etc. The hardware structures of the base station 10 and terminal 20 may include one or more of each of the devices illustrated in the figure, or may be configured without including some of the devices.

Each function in the base station 10 and terminal 20 is realized by having the processor 1001 perform an operation by reading predetermined software (programs) onto hardware such as the processor 1001 and the storage device 1002, and by controlling communication by the communication device 1004 and controlling at least one of reading and writing of data in the storage device 1002 and the auxiliary storage device 1003.

The processor 1001 controls the entire computer by, for example, controlling the operating system. The processor 1001 may include a central processing unit (CPU) including an interface with a peripheral apparatus, a control apparatus, a calculation apparatus, a register, etc. For example, the above-described control unit 140, control unit 240, and the like, may be implemented by the processor 1001.

Further, the processor 1001 reads out onto the storage device 1002 a program (program code), a software module, or data from the auxiliary storage device 1003 and/or the communication device 1004, and performs various processes according to the program, the software module, or the data. As the program, a program is used that causes the computer to perform at least a part of operations according to an embodiment of the present invention described above. For example, the control unit 140 of the base station 10 illustrated in FIG. 22 may be realized by control programs that are stored in the storage device 1002 and are executed by the processor 1001. Further, for example, the control unit 240 of the terminal 20 illustrated in FIG. 23 may be realized by control programs that are stored in the storage device 1002 and are executed by the processor 1001. The various processes have been described to be performed by a single processor 1001. However, the processes may be performed by two or more processors 1001 simultaneously or sequentially. The processor 1001 may be implemented by one or more chips. It should be noted that the program may be transmitted from a network via a telecommunication line.

The storage device 1002 is a computer-readable recording medium, and may include at least one of a ROM (Read Only Memory), an EPROM (Erasable Programmable ROM), an EEPROM (Electrically Erasable Programmable ROM), a RAM (Random Access Memory), etc. The storage device 1002 may be referred to as a register, a cache, a main memory, etc. The storage device 1002 is capable of storing programs (program codes), software modules, or the like, that are executable for performing communication processes according to an embodiment of the present invention.

The auxiliary storage device 1003 is a computer-readable recording medium, and may include at least one of, for example, an optical disk such as a CD-ROM (Compact Disc ROM), a hard disk drive, a flexible disk, a magneto optical disk (e.g., compact disk, digital versatile disk, Blu-ray (registered trademark) disk), a smart card, a flash memory (e.g., card, stick, key drive), a floppy (registered trademark) disk, a magnetic strip, etc. The above recording medium may be a database including the storage device 1002 and/or the auxiliary storage device 1003, a server, or any other appropriate medium.

The communication device 1004 is hardware (transmission or reception device) for communicating with computers via at least one of a wired network and a wireless network, and may be referred to as a network device, a network controller, a network card, a communication module, etc. The communication device 1004 may include a high frequency switch, duplexer, filter, frequency synthesizer, or the like, for example, to implement at least one of a frequency division duplex (FDD) and a time division duplex (TDD). For example, the transmitting/receiving antenna, the amplifier unit, the transmitting/receiving unit, the transmission line interface, and the like, may be implemented by the communication device 1004. The transmitting/receiving unit may be physically or logically divided into a transmitting unit and a receiving unit.

The input device 1005 is an input device that receives an external input (e.g., keyboard, mouse, microphone, switch, button, sensor). The output device 1006 is an output device that outputs something to the outside (e.g., display, speaker, LED lamp). It should be noted that the input device 1005 and the output device 1006 may be integrated into a single device (e.g., touch panel).

Further, the apparatuses including the processor 1001, the storage device 1002, etc., are connected to each other via the bus 1007 used for communicating information. The bus 1007 may include a single bus, or may include different buses between the apparatuses.

Further, each of the base station 10 and the terminal 20 may include hardware such as a microprocessor, a digital signal processor (DSP), an ASIC (Application Specific Integrated Circuit), a PLD (Programmable Logic Device), a FPGA (Field Programmable Gate Array), etc., and a part or all of each functional block may be realized by the hardware. For example, the processor 1001 may be implemented by at least one of the above hardware elements.

Figure 25:
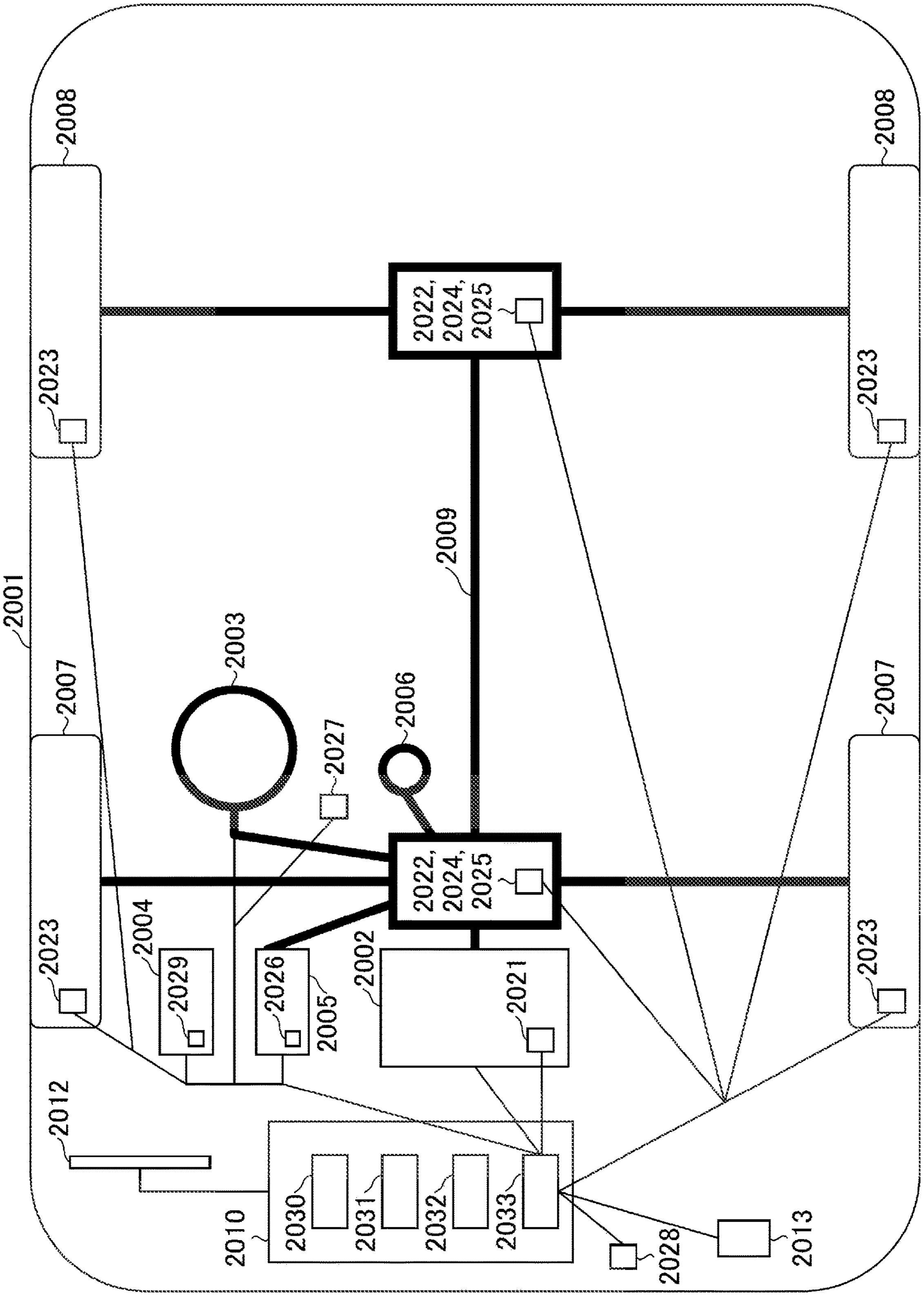
FIG. 25 is a drawing illustrating an example of a structure of a vehicle 2001 in an embodiment of the present invention.

FIG. 25 shows an example of a configuration of a vehicle 2001. As shown in FIG. 25, the vehicle 2001 includes a drive unit 2002, a steering unit 2003, an accelerator pedal 2004, a brake pedal 2005, a shift lever 2006, a front wheel 2007, a rear wheel 2008, an axle 2009, an electronic control unit 2010, various sensors 2021-2029, an information service unit 2012, and a communication module 2013. The aspects/embodiments described in the present disclosure may be applied to a communication device mounted in the vehicle 2001, and may be applied to, for example, the communication module 2013.

The drive unit 2002 may include, for example, an engine, a motor, and a hybrid of an engine and a motor. The steering unit 2003 includes at least a steering wheel and is configured to steer at least one of the front wheel and the rear wheel, based on the operation of the steering wheel operated by the user.

The electronic control unit 2010 includes a microprocessor 2031, a memory (ROM, RAM) 2032, and a communication port (IO port) 2033. The electronic control unit 2010 receives signals from the various sensors 2021-2029 provided in the vehicle 2001. The electronic control unit 2010 may be referred to as an ECU (Electronic control unit).

The signals from the various sensors 2021 to 2029 include a current signal from a current sensor 2021 which senses the current of the motor, a front or rear wheel rotation signal acquired by a revolution sensor 2022, a front or rear wheel pneumatic signal acquired by a pneumatic sensor 2023, a vehicle speed signal acquired by a vehicle speed sensor 2024, an acceleration signal acquired by an acceleration sensor 2025, a stepped-on accelerator pedal signal acquired by an accelerator pedal sensor 2029, a stepped-on brake pedal signal acquired by a brake pedal sensor 2026, an operation signal of a shift lever acquired by a shift lever sensor 2027, and a detection signal, acquired by the object detection sensor 2028, for detecting an obstacle, a vehicle, a pedestrian, and the like.

The information service unit 2012 includes various devices for providing various kinds of information such as driving information, traffic information, and entertainment information, including a car navigation system, an audio system, a speaker, a television, and a radio, and one or more ECUs controlling these devices. The information service unit 2012 provides various types of multimedia information and multimedia services to the occupants of the vehicle 2001 by using information obtained from the external device through the communication module 2013 or the like.

A driving support system unit 2030 includes: various devices for providing functions of preventing accidents and reducing driver's operating loads such as a millimeter wave radar, a LiDAR (Light Detection and Ranging), a camera, a positioning locator (e.g., GNSS, etc.), map information (e.g., high definition (HD) map, autonomous vehicle (AV) map, etc.), a gyro system (e.g., IMU (inertial Measurement Unit), INS (inertial Navigation System), etc.), an AI (Artificial Intelligence) chip, an AI processor; and one or more ECUs controlling these devices. In addition, the driving support system unit 2030 transmits and receives various types of information via the communication module 2013 to realize a driving support function or an autonomous driving function.

The communication module 2013 may communicate with the microprocessor 2031 and components of the vehicle 2001 via a communication port. For example, the communication module 2013 transmits and receives data via a communication port 2033, to and from the drive unit 2002, the steering unit 2003, the accelerator pedal 2004, the brake pedal 2005, the shift lever 2006, the front wheel 2007, the rear wheel 2008, the axle 2009, the microprocessor 2031 and the memory (ROM, RAM) 2032 in the electronic control unit 2010, and sensors 2021-29 provided in the vehicle 2001.

The communication module 2013 is a communication device that can be controlled by the microprocessor 2031 of the electronic control unit 2010 and that is capable of communicating with external devices. For example, various kinds of information are transmitted to and received from external devices through radio communication. The communication module 2013 may be internal to or external to the electronic control unit 2010. The external devices may include, for example, a base station, a mobile station, or the like.

The communication module 2013 transmits a current signal, which is input, to the electronic control unit 2010 from the current sensor, to the external devices through radio communication. In addition, the communication module 2013 also transmits, to the external devices through radio communication, the front or rear wheel rotation signal acquired by the revolution sensor 2022, the front or rear wheel pneumatic signal acquired by the pneumatic sensor 2023, the vehicle speed signal acquired by the vehicle speed sensor 2024, the acceleration signal acquired by the acceleration sensor 2025, the stepped-on accelerator pedal signal acquired by the accelerator pedal sensor 2029, the stepped-on brake pedal signal acquired by the brake pedal sensor 2026, the operation signal of the shift lever acquired by the shift lever sensor 2027, and the detection signal, acquired by the object detection sensor 2028, for detecting an obstacle, a vehicle, a pedestrian, and the like, that are input to the electronic control unit 2010.

The communication module 2013 receives various types of information (traffic information, signal information, inter-vehicle information, etc.) transmitted from the external devices and displays the received information on the information service unit 2012 provided in the vehicle 2001. In addition, the communication module 2013 stores the various types of information received from the external devices in the memory 2032 available to the microprocessor 2031. Based on the information stored in the memory 2032, the microprocessor 2031 may control the drive unit 2002, the steering unit 2003, the accelerator pedal 2004, the brake pedal 2005, the shift lever 2006, the front wheel 2007, the rear wheel 2008, the axle 2009, the sensors 2021-2029, etc., mounted in vehicle 2001.

Embodiment Summary

As described above, according to an embodiment of the present invention, a terminal is provided. The terminal includes: a reception unit configured to receive a configuration related to an uplink control channel from a base station: a control unit configured to determine a resource of the uplink control channel, based on the configuration; and a transmission unit configured to transmit the uplink control channel via the resource. In a case where the configuration indicates that frequency hopping is disabled, the control unit causes a base sequence applied to a first half of the resource to be different from a base sequence applied to a second half of the resource, and determines the resource to be different from a resource used by a UE that is not a function-reduced UE.

According to the above-described configuration, orthogonal PUCCH resources can be efficiently configured for both the RedCap UE and the normal UE. In other words, in the wireless communication system, the efficient coexistence of function-reduced terminals and normal terminals can be achieved.

A cyclic shift value that is different from a cyclic shift value used by the UE that is not a function-reduced UE may be applied to the different resource. According to the above-described configuration, orthogonal PUCCH resources can be efficiently configured for both the RedCap UE and the normal UE.

A TD-OCC (Time domain-Orthogonal cover code) may be applied to the different resource. According to the above-described configuration, orthogonal PUCCH resources can be efficiently configured for both the RedCap UE and the normal UE.

The transmission unit may indicate, to the base station, that the terminal is a function-reduced UE during a random access procedure. According to the above-described configuration, orthogonal PUCCH resources can be efficiently configured for both the RedCap UE and the normal UE.

The transmission unit is not required to transmit a second hop of the resource to the base station. According to the above-described configuration, orthogonal PUCCH resources can be efficiently configured for both the RedCap UE and the normal UE.

In addition, according to an embodiment of the present invention, a communication method performed by a terminal is provided. The communication method includes: receiving a configuration related to an uplink control channel from a base station; determining a resource of the uplink control channel, based on the configuration; transmitting the uplink control channel via the resource; and in a case where the configuration indicates that frequency hopping is disabled, causing a base sequence applied to a hop of a first half of the resource to be different from a base sequence applied to a hop of a second half of the resource, and determining the resource to be different from a resource used by a UE that is not a function-reduced UE.

According to the above-described configuration, orthogonal PUCCH resources can be efficiently configured for both the RedCap UE and the normal UE. In other words, in the wireless communication system, the efficient coexistence of function-reduced terminals and normal terminals can be achieved.

Supplement of Embodiment

As described above, one or more embodiments have been described. The present invention is not limited to the above embodiments. A person skilled in the art should understand that there are various modifications, variations, alternatives, replacements, etc., of the embodiments. In order to facilitate understanding of the present invention, specific values have been used in the description. However, unless otherwise specified, those values are merely examples and other appropriate values may be used. The division of the described items may not be essential to the present invention. The things that have been described in two or more items may be used in a combination if necessary, and the thing that has been described in one item may be appropriately applied to another item (as long as there is no contradiction). Boundaries of functional units or processing units in the functional block diagrams do not necessarily correspond to the boundaries of physical parts. Operations of multiple functional units may be physically performed by a single part, or an operation of a single functional unit may be physically performed by multiple parts. The order of sequences and flowcharts described in an embodiment of the present invention may be changed as long as there is no contradiction. For the sake of description convenience, the base station 10 and the terminal 20 have been described by using functional block diagrams. However, the apparatuses may be realized by hardware, software, or a combination of hardware and software. The software executed by a processor included in the base station 10 according to an embodiment of the present invention and the software executed by a processor included in the terminal 20 according to an embodiment of the present invention may be stored in a random access memory (RAM), a flash memory, a read only memory (ROM), an EPROM, an EEPROM, a register, a hard disk (HDD), a removable disk, a CD-ROM, a database, a server, or any other appropriate recording medium.

Further, information indication may be performed not only by methods described in an aspect/embodiment of the present specification but also a method other than those described in an aspect/embodiment of the present specification. For example, the information transmission may be performed by physical layer signaling (e.g., DCI (Downlink Control Information). UCI (Uplink Control Information)), upper layer signaling (e.g., RRC (Radio Resource Control) signaling, MAC (Medium Access Control) signaling, broadcast information (MIB (Master Information Block), SIB (System Information Block))), other signals, or combinations thereof. Further, RRC signaling may be referred to as an RRC message. The RRC signaling may be, for example, an RRC connection setup message, an RRC connection reconfiguration message, or the like.

Each aspect/embodiment described in the present disclosure may be applied to at least, one of a system using LTE (Long Term Evolution), LTE-A (LTE-Advanced), SUPER 3G, IMT-Advanced, 4G (4th generation mobile communication system), 5G (5th generation mobile communication system), 6th generation mobile communication system (6G), xth generation mobile communication system (xG) (xG (x is, for example, an integer, decimal)), FRA (Future Radio Access), NR (new Radio), New radio access (NX), Future generation radio access (FX), W-CDMA (registered trademark), GSM (registered trademark), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-Wide Band), Bluetooth (registered trademark), and other appropriate systems, and a next generation system enhanced, modified, developed, or defined therefrom. Further, multiple systems may also be applied in combination (e.g., at least one of LTE and LTE-A combined with 5G, etc.).

The order of processing steps, sequences, flowcharts or the like of an aspect/embodiment described in the present specification may be changed as long as there is no contradiction. For example, in a method described in the present specification, elements of various steps are presented in an exemplary order. The order is not limited to the presented specific order.

The particular operations, that are supposed to be performed by the base station 10 in the present specification, may be performed by an upper node in some cases. In a network including one or more network nodes including the base station 10, it is apparent that various operations performed for communicating with the terminal 20 may be performed by the base station 10 and/or another network node other than the base station 10 (for example, but not limited to, MME or S-GW). According to the above, a case is described in which there is a single network node other than the base station 10. However, a combination of multiple other network nodes may be considered (e.g., MME and S-GW).

The information or signals described in this disclosure may be output from a higher layer (or lower layer) to a lower layer (or higher layer). The information or signals may be input or output through multiple network nodes.

The input or output information may be stored in a specific location (e.g., memory) or managed using management tables. The input or output information may be overwritten, updated, or added. The information that has been output may be deleted. The information that has been input may be transmitted to another apparatus.

A decision or a determination in an embodiment of the present invention may be realized by a value (0 or 1) represented by one bit, by a boolean value (true or false), or by comparison of numerical values (e.g., comparison with a predetermined value).

Software should be broadly interpreted to mean, whether referred to as software, firmware, middle-ware, microcode, hardware description language, or any other name, instructions, instruction sets, codes, code segments, program codes, programs, subprograms, software modules, applications, software applications, software packages, routines, subroutines, objects, executable files, executable threads, procedures, functions, and the like.

Further, software, instructions, information, and the like may be transmitted and received via a transmission medium. For example, in the case where software is transmitted from a website, server, or other remote source using at least one of wired line technologies (such as coaxial cable, fiber optic cable, twisted pair, digital subscriber line (DSL) and wireless technologies (infrared, microwave, etc.), at least one of these wired line technologies and wireless technologies is included within the definition of the transmission medium.

Information, a signal, or the like, described in the present specification may be represented by using any one of various different, technologies. For example, data, an instruction, a command, information, a signal, a bit, a symbol, a chip, or the like, described throughout the present application, may be represented by a voltage, an electric current, electromagnetic waves, magnetic fields, a magnetic particle, optical fields, a photon, or a combination thereof.

It should be noted that a term used in the present specification and/or a term required for understanding of the present specification may be replaced by a term having the same or similar meaning. For example, a channel and/or a symbol may be a signal (signaling). Further, a signal may be a message. Further, the component carrier (CC) may be referred to as a carrier frequency, cell, frequency carrier, or the like.

As used in the present disclosure, the terms “system” and “network” are used interchangeably.

Further, the information, parameters, and the like, described in the present disclosure may be expressed using absolute values, relative values from predetermined values, or they may be expressed using corresponding different information. For example, a radio resource may be what is indicated by an index.

The names used for the parameters described above are not used as limitations. Further, the mathematical equations using these parameters may differ from those explicitly disclosed in the present disclosure. Because the various channels (e.g., PUCCH, PDCCH) and information elements may be identified by any suitable names, the various names assigned to these various channels and information elements are not used as limitations.

In the present disclosure, the terms “BS: Base Station”, “Radio Base Station”, “Base Station”, “Fixed Station”, “NodeB”, “eNodeB (eNB)”, “gNodeB (gNB)”, “Access Point”, “Transmission Point”, “Reception Point”, “Transmission/Reception Point”, “Cell”, “Sector”, “Cell Group”, “Carrier”, “Component Carrier”, and the like, may be used interchangeably. The base station may be referred to as a macro-cell, a small cell, a femtocell, a picocell and the like.

The base station may accommodate (provide) one or more (e.g., three) cells. In the case where the base station accommodates a plurality of cells, the entire coverage area of the base station may be divided into a plurality of smaller areas, each smaller area may provide communication services by means of a base station subsystem (e.g., an indoor small base station or a remote Radio Head (RRH)). The term “cell” or “sector” refers to a part or all of the coverage area of at least one of the base station and base station subsystem that provides communication services at the coverage.

In the present disclosure, terms such as “mobile station (MS)”, “user terminal”, “user equipment (UE)”, “terminal”, and the like, may be used interchangeably.

There is a case in which the mobile station may be referred to, by a person skilled in the art, as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other appropriate terms.

At least one of the base station and the mobile station may be referred to as a transmission apparatus, reception apparatus, communication apparatus, or the like. The at least one of the base station and the mobile station may be a device mounted on the mobile station, the mobile station itself, or the like. The mobile station may be a vehicle (e.g., a car, an airplane, etc.), an unmanned mobile body (e.g., a drone, an automated vehicle, etc.), or a robot (manned or unmanned). At least one of the base station and the mobile station may include an apparatus that does not necessarily move during communication operations. For example, at least one of the base station and the mobile station may be an IoT (Internet of Things) device such as a sensor.

Further, the base station in the present disclosure may be read as the user terminal. For example, each aspect/embodiment of the present disclosure may be applied to a configuration in which communications between the base station and the user terminal are replaced by communications between multiple terminals 20 (e.g., may be referred to as D2D (Device-to-Device), V2X (Vehicle-to-Everything), etc.). In this case, the function of the base station 10 described above may be provided by the terminal 20. Further, the phrases “up” and “down” may also be replaced by the phrases corresponding to terminal-to-terminal communication (e.g., “side”). For example, an uplink channel, a downlink channel, or the like, may be read as a sidelink channel.

Further, the user terminal in the present disclosure may be read as the base station. In this case, the function of the user terminal described above may be provided by the base station.

The term “determining” used in the present specification may include various actions or operations. The terms “determination” and “decision” may include “determination” and “decision” made with judging, calculating, computing, processing, deriving, investigating, searching (looking up, search, inquiry) (e.g., search in a table, a database, or another data structure), or ascertaining. Further, the “determining” may include “determining” made with receiving (e.g., receiving information), transmitting (e.g., transmitting information), inputting, outputting, or accessing (e.g., accessing data in a memory). Further, the “determining” may include a case in which “resolving”, “selecting”, “choosing”, “establishing”, “comparing”, or the like is deemed as “determining”. In other words, the “determining” may include a case in which a certain action or operation is deemed as “determining”. Further, “decision” may be read as “assuming”, “expecting”, or “considering”, etc.

The term “connected” or “coupled” or any variation thereof means any direct or indirect connection or connection between two or more elements and may include the presence of one or more intermediate elements between the two elements “connected” or “coupled” with each other. The coupling or connection between the elements may be physical, logical, or a combination thereof. For example, “connection” may be read as “access”. As used in the present disclosure, the two elements may be thought of as being “connected” or “coupled” to each other using at least one of the one or more wires, cables, and printed electrical connections and, as a number of non-limiting and non-inclusive examples, electromagnetic energy having wavelengths in the radio frequency region, the microwave region, and the light (both visible and invisible) region.

The reference signal may be abbreviated as RS or may be referred to as a pilot, depending on the applied standards.

The description “based on” used in the present specification does not mean “based on only” unless otherwise specifically noted. In other words, the phrase “based on” means both “based on only” and “based on at least”.

Any reference to an element using terms such as “first” or “second” as used in the present disclosure does not generally limit the amount or the order of those elements. These terms may be used in the present disclosure as a convenient way to distinguish between two or more elements. Therefore, references to the first and second elements do not imply that only two elements may be employed or that the first element must in some way precede the second element.

“Means” included in the configuration of each of the above apparatuses may be replaced by “parts”, “circuits”, “devices”, etc.

In the case where the terms “include”, “including” and variations thereof are used in the present disclosure, these terms are intended to be comprehensive in the same way as the term “comprising”. Further, the term “or” used in the present specification is not intended to be an “exclusive or”.

A radio frame may include one or more frames in the time domain. Each of the one or more frames in the time domain may be referred to as a subframe. The subframe may further include one or more slots in the time domain. The subframe may be a fixed length of time (e.g., 1 ms) independent from the numerology.

The numerology may be a communication parameter that is applied to at least one of the transmission or reception of a signal or channel. The numerology may indicate at least one of, for example, subcarrier spacing (SCS), bandwidth, symbol length, cyclic prefix length, transmission time interval (TTI), number of symbols per TTI, radio frame configuration, specific filtering processing performed by the transceiver in the frequency domain, and specific windowing processing performed by the transceiver in the time domain.

The slot may include one or more symbols in the time domain (OFDM (Orthogonal Frequency Division Multiplexing) symbols, SC-FDMA (Single Carrier Frequency Division Multiple Access) symbols, and the like). The slot may be a time unit based on the numerology.

The slot may include a plurality of mini slots. Each mini slot may include one or more symbols in the time domain. Further, the mini slot may be referred to as a sub-slot. The mini slot may include fewer symbols than the slot. PDSCH (or PUSCH) transmitted in time units greater than a mini slot may be referred to as PDSCH (or PUSCH) mapping type A. PDSCH (or PUSCH) transmitted using a mini slot may be referred to as PDSCH (or PUSCH) mapping type B.

A radio frame, a subframe, a slot, a mini slot and a symbol all represent time units for transmitting signals. Different terms may be used for referring to a radio frame, a subframe, a slot, a mini slot, and a symbol, respectively.

For example, one subframe may be referred to as a transmission time interval (TTI), multiple consecutive subframes may be referred to as a TTI, and one slot or one mini slot may be referred to as a TTI. In other words, at least one of the subframe and the TTI may be a subframe (1 ms) in an existing LTE, a period shorter than 1 ms (e.g., 1-13 symbols), or a period longer than 1 ms. It should be noted that the unit representing the TTI may be referred to as a slot, a mini slot, or the like, rather than a subframe.

The TTI refers to, for example, the minimum time unit for scheduling in wireless communications. For example, in an LTE system, a base station schedules each terminal 20 to allocate radio resources (such as frequency bandwidth, transmission power, etc. that can be used in each terminal 20) in TTI units. The definition of TTI is not limited to the above.

The TTI may be a transmission time unit, such as a channel-encoded data packet (transport block), code block, codeword, or the like, or may be a processing unit, such as scheduling or link adaptation. It should be noted that, when a TTI is provided, the time interval (e.g., the number of symbols) during which the transport block, code block, codeword, or the like, is actually mapped may be shorter than the TTI.

It should be noted that, when one slot or one mini slot, is referred to as a TTI, one or more TTIs (i.e., one or more slots or one or more mini slots) may be the minimum time unit for scheduling. Further, the number of slots (the number of mini slots) constituting the minimum time unit of the scheduling may be controlled.

A TTI having a time length of 1 ms may be referred to as a normal TTI (a TTI in LTE Rel. 8-12), a long TTI, a normal subframe, a long subframe, a slot, and the like. A TTI that is shorter than the normal TTI may be referred to as a shortened TTI, a short TTI, a partial TTI (or fractional TTI), a shortened subframe, a short subframe, a mini slot, a subslot, a slot, or the like.

It should be noted that the long TTI (e.g., normal TTI, subframe, etc.) may be replaced with a TTI having a time length exceeding 1 ms, and the short TTI (e.g., shortened TTI, etc.) may be replaced with a TTI having a TTI length less than the TTI length of the long TTI and a TTI length greater than 1 ms.

A resource block (RB) is a time domain and frequency domain resource allocation unit and may include one or more consecutive subcarriers in the frequency domain. The number of subcarriers included in an RB may be the same, regardless of the numerology, and may be 12, for example. The number of subcarriers included in an RB may be determined on the basis of numerology.

Further, the time domain of an RB may include one or more symbols, which may be 1 slot, 1 mini slot, 1 subframe, or 1 TTI in length. One TTI, one subframe, etc., may each include one or more resource blocks.

It should be noted that one or more RBs may be referred to as physical resource blocks (PRBs, Physical RBs), subcarrier groups (SCGs), resource element groups (REGs), PRB pairs, RB pairs, and the like.

Further, a resource block may include one or more resource elements (RE). For example, 1 RE may be a radio resource area of one sub-carrier and one symbol.

The bandwidth part (BWP) (which may also be referred to as a partial bandwidth, etc.) may represent, a subset of consecutive common RBs (common resource blocks) for a given numerology in a carrier. Here, a common RB may be identified by an index of RB relative to the common reference point of the carrier. A PRB may be defined in a BWP and may be numbered within the BWP.

BWP may include BWP for UL (UL, BWP) and BWP for DL (DL BWP). For a terminal 20, one or more BWPs may be configured in one carrier.

At least one of the configured BWPs may be activated, and the terminal 20 may assume that the terminal 20 will not transmit and receive signals/channels outside the activated BWP. It should be noted that the terms "cell" and "carrier" in this disclosure may be replaced by "BWP."

Structures of a radio frame, a subframe, a slot, a mini slot, and a symbol described above are exemplary only. For example, the number of subframes included in a radio frame, the number of slots per subframe or radio frame, the number of mini slots included in a slot, the number of symbols and RBs included in a slot or mini slot, the number of subcarriers included in an RB, the number of symbols in a TTI, the symbol length, the cyclic prefix (CP) length, and the like, may be changed in various ways.

In the present disclosure, where an article is added by translation, for example "a", "an", and "the", the disclosure may include that the noun following these articles is plural.

In this disclosure, the term "A and B are different" may mean "A and B are different from each other." It should be noted that the term "A and B are different" may mean "A and B are different from C." Terms such as "separated" or "combined" may be interpreted in the same way as the above-described "different".

Each aspect/embodiment described in the present specification may be used independently, may be used in combination, or may be used by switching according to operations. Further, notification (transmission/reporting) of predetermined information (e.g., notification (transmission/reporting) of "X") is not limited to an explicit notification (transmission/reporting), and may be performed by an implicit notification (transmission/reporting) (e.g., by not performing notification (transmission/reporting) of the predetermined information).

As described above, the present invention has been described in detail. It is apparent to a person skilled in the art that the present invention is not limited to one or more embodiments of the present invention described in the present specification. Modifications, alternatives, replacements, etc., of the present invention may be possible without departing from the subject matter and the scope of the present invention defined by the descriptions of claims. Therefore, the descriptions of the present specification are for illustrative purposes only, and are not intended to be limitations to the present invention.

DESCRIPTION OF THE REFERENCE NUMERALS

10 Base station
110 Transmission unit

120 Reception unit
130 Configuration unit
140 Control unit
20 Terminal
210 Transmission unit
220 Reception unit.
230 Configuration unit
240 Control unit
1001 Processor
1002 Storage device
1003 Auxiliary storage device
1004 Communication device
1005 Input device
1006 Output device
2001 Vehicle
2002 Drive unit
2003 Steering unit
2004 Accelerator pedal
2005 Brake pedal
2006 Shift lever
2007 Front wheel
2008 Rear wheel
2009 Axle
2010 Electronic control unit
2012 Information service unit
2013 Communication module
2021 Current sensor
2022 Revolution sensor
2023 Pneumatic sensor
2024 Vehicle speed sensor
2025 Acceleration sensor
2026 Brake pedal sensor
2027 Shift lever sensor
2028 Object detection sensor
2029 Accelerator pedal sensor
2030 Driving support system unit
2031 Microprocessor
2032 Memory (ROM, RAM)
2033 Communication port (IO port)

The invention claimed is:

1. A terminal comprising:

a receiver configured to receive system information from a base station;

a processor configured to determine an uplink control channel resource that is different from an uplink control channel resource used by a UE (User Equipment) that is not a function-reduced UE in a case where an initial UL-BWP (Uplink Bandwidth part) for a reduced-function UE is configured by the system information, where the UL-BWP is configured within the maximum bandwidth for the function-reduced UE by the system information, and where frequency hopping is configured to be disabled by the system information; and a transmitter configured to transmit an indication indicating that the terminal is a function-reduced UE to the base station during a random access procedure, and to transmit an uplink control channel including HARQ-ACK (Hybrid Automatic Repeat reQuest ACKnowledgement) corresponding to an indication from the base station after the indication during the random access procedure to the base station by using the different uplink control channel resource, wherein the processor determines the different uplink control channel resource by adding a PRB (Physical resource block) offset configured by RRC (Radio Resource Control) signaling to a PRB offset used by the UE that is not a function-reduced UE.

2. The terminal as claimed in claim 1, wherein the transmitter transmits the indication indicating that the terminal is a function-reduced UE to the base station via Msg.1 or Msg.A during the random access procedure, and transmits an uplink control channel including HARQ-ACK corresponding to Msg.4 or Msg.B in the random access procedure by using the different uplink channel resource.

3. A base station comprising:

a transmitter configured to transmit system information to a terminal;

a processor configured to determine an uplink control channel resource that is different from an uplink control channel resource used by a UE (User Equipment) that is not a function-reduced UE in a case where an initial UL-BWP (Uplink Bandwidth part) for a reduced-function UE is configured by the system information, where the UL-BWP is configured within the maximum bandwidth for the function-reduced UE by the system information, and where frequency hopping is configured to be disabled by the system information; and a receiver configured to receive an indication indicating that the terminal is a function-reduced UE from the terminal during a random access procedure, and to receive an uplink control channel including HARQ-ACK (Hybrid Automatic Repeat reQuest ACKnowledgement) corresponding to an indication from the base station after the indication during the random access procedure from the terminal by using the different uplink control channel resource, wherein the processor determines the different uplink control channel resource by adding a PRB (Physical resource block) offset configured by RRC (Radio Resource Control) signaling to a PRB offset used by the UE that is not a function-reduced UE.

4. A communication system comprising: a base station; and a terminal, wherein the base station includes:

a transmitter configured to transmit system information to the terminal;

a processor configured to determine an uplink control channel resource that is different from an uplink control channel resource used by a UE (User Equipment) that is not a function-reduced UE in a case where an initial UL-BWP (Uplink Bandwidth part) for a reduced-function UE (User Equipment) is configured by the system information, where the UL-BWP is configured within the maximum bandwidth for the function-reduced UE by the system information, and where frequency hopping is configured to be disabled by the system information; and a receiver configured to receive an indication indicating that the terminal is a function-reduced UE from the terminal during a random access procedure, and to receive an uplink control channel including HARQ-ACK (Hybrid Automatic Repeat reQuest ACKnowledgement) corresponding to an indication from the base station after the indication during the random access procedure from the terminal by using the different uplink control channel resource, wherein the processor determines the different uplink control channel resource by adding a PRB (Physical resource block) offset configured by RRC (Radio Resource Control) signaling to a PRB offset used by the UE that is not a function-reduced UE, and the terminal includes:

a receiver configured to receive system information from the base station;

a processor configured to determine an uplink control channel resource that is different from an uplink control channel resource used by a UE that is not a function-reduced UE in a case where an initial UL-BWP (Uplink Bandwidth part) for a reduced-function UE is configured by the system information, where the UL-BWP is configured within the maximum bandwidth for the function-reduced UE by the system information, and where frequency hopping is configured to be disabled by the system information; and a transmitter configured to transmit an indication indicating that the terminal is a function-reduced UE to the base station during a random access procedure, and to transmit an uplink control channel including HARQ-ACK corresponding to an indication from the base station after the indication during the random access procedure to the base station by using the different uplink control channel resource, wherein the processor determines the different uplink control channel resource by adding a PRB (Physical resource block) offset configured by RRC (Radio Resource Control) signaling to a PRB offset used by the UE that is not a function-reduced UE.

5. A communication method performed by a terminal, the communication method comprising:

receiving system information from a base station;

determining an uplink control channel resource that is different from an uplink control channel resource used by a UE (User Equipment) that is not a function-reduced UE in a case where an initial UL-BWP (Uplink Bandwidth part) for a reduced-function UE is configured by the system information, where the UL-BWP is configured within the maximum bandwidth for the function-reduced UE by the system information, and where frequency hopping is configured to be disabled by the system information; and transmitting an indication indicating that the terminal is a function-reduced UE to the base station during a random access procedure, and transmitting an uplink control channel including HARQ-ACK (Hybrid Automatic Repeat reQuest ACKnowledgement) corresponding to an indication from the base station after the indication during the random access procedure to the base station by using the different uplink control channel resource, wherein determining the uplink control channel resource comprises adding a PRB (Physical resource block) offset configured by RRC (Radio Resource Control) signaling to a PRB offset used by the UE that is not a function-reduced UE.

* * * * *